3,752,801
Patented Aug. 14, 1973

3,752,801
FIBER-REACTIVE PHTHALOCYANINE-SULFON-AMIDO AZO-PYRIDONE DYESTUFFS
Gerd Hoelzle, Liestal, and Alfred Fasciati, Bottmingen, Switzerland, assignors to Ciba-Geigy AG, Basel, Switzerland
No Drawing. Filed June 4, 1970, Ser. No. 43,605
Claims priority, application Switzerland, June 12, 1969, 8,983/69, June 12, 1969, 18,644/69; Apr. 20, 1970, 5,874/70
Int. Cl. C09b 29/36, 62/02, 62/08
U.S. Cl. 260—146 T       15 Claims

ABSTRACT OF THE DISCLOSURE

Phthalocyaninesulfonamido azo-pyridone dyestuffs of the general formula

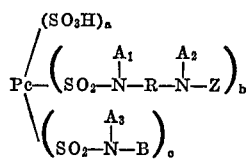

in which

Pc is nickel or copper phthalocyanine
$A_1$, $A_2$ and $A_3$ each independently is hydrogen, lower alkyl or hydroxyethyl
R is phenylene, methylenephenylene, ethylenephenylene or diphenylene, each of which is unsubstituted or substituted in the phenylene moiety by one or more of chloro, $C_1$–$C_2$ alkoxy, $C_1$–$C_2$ alkyl or sulfonic acid, or alkylene or cycloalkylene of 2 to 6 carbon atoms, each of which is unsubstituted or substituted by β-hydroxyethyl, acetyl or carbamyl, ethylenepiperazinylene or R together with $A_1$ and $A_2$ forms piperazinylene or piperidnylene,
Z is a fibre-reactive group capable of reacting with the hydroxyl groups of cellulose to form a covalent bond
B is a group of the formula

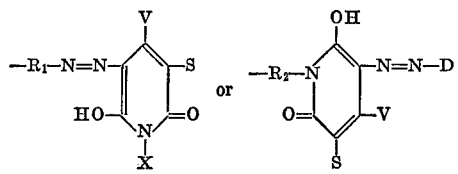

in which $R_1$ is phenylene, methylenephenylene or ethylenephenylene where the phenylene moiety is substituted by one or more of chloro, $C_1$–$C_2$ alkoxy, $C_1$–$C_2$ alkyl or sulfonic acid and wherein the phenyl moiety is bound to the azo group
V is lower alkyl, phenyl, tolyl, carboxylic acid ethyl ester, carboxylic acid benzyl ester, methylene carboxylic acid ethyl ester, carbamyl, N-ethyl carbamyl, or β-cyanoethylene
S is nitrile, carboxylic acid ethyl ester, carbamyl, N,N-dimethylsulfamyl, methylsulfonyl or phenylsulfonyl
X is hydrogen, lower alkyl which is unsubstituted or substituted by amino, hydroxyl, sulfonic acid or β-hydroxyethyleneamine, phenyl, benzyl, cyclohexyl, each of which can be substituted by amino, or X is a group of the formula

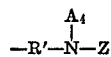

where

R' is alkylene of 1 to 6 carbon atoms, cyclohexylene, phenylene or methylenephenylene
$A_4$ is hydrogen or lower alkyl, and
Z is a fiber-reactive group
$R_2$ is $C_1$–$C_6$ alkylene
D is benzenesulfonate containing one or more sulfonic acid groups and substituted by one or more of chloro, hydroxy, methoxy, methyl, carboxy, acetamido, benzamido, nitro, sulphoacetylamino, trifluoromethyl or aminobenzoyl, or naphthalenesulfonate containing one or more sulfonic acid groups and D can additionally be substituted by a fibre-reactive group, and
a, b and c each, independently is an integer or fractional number provided that b and c is each at least 1.0 and the sum of $a+b+c$ is an integer or fractional number between 3.0 and 4.0, are useful as cotton dyes yielding green shades of good general fastness properties.

---

The present invention provides phthalocyanine dyestuffs of the general formula

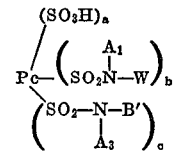

wherein Pc represents a phthalocyanine radical, W represents a fibre-reactive radical, B' represents a radical of the formula

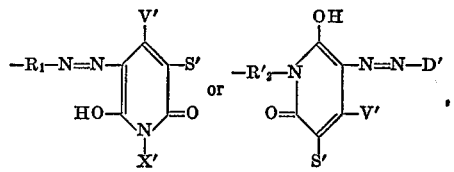

D' represents the radical of a diazo component which radical preferably contains one or more sulpho groups and which may also contain one or more fibre-reactive radicals as substituent(s) X' repreesnts a hydrogen atom or an organic, optionally fibre-reactive, radical, $R_1$ repreesnts an aromatic bridge member or an araliphatic bridge member which is aromatically bonded to the azo bridge, $R_2'$ repreesnts an aliphatic, cycloaiiphatic, aromatic or an araliphatic or heterocyclic bridge member each of $A_1$ and $A_3$, which may be the same or different, represents a low molecular weight alkyl or aralkyl radical, preferably containing at most 4 aliphatically bonded C-atoms, or represents a hydrogen atom, S' represents a hydrogen atom, an organic radical or a modified sulphonic acid or a modified carboxylic acid group, V' represents a hydrogen atom, an organic radical or a modified carboxylic acid group, and each of a, b and c, which may be the same or different, represents an integer or a fractional number, with the proviso that each of b and c must be at least 1.0 and $a+b+c$ must be an integer or fractional number equal to or between 3.0 and 4.0.

The phythalocyanine dyestuffs of the invention preferably have the general Formula 1

(1)

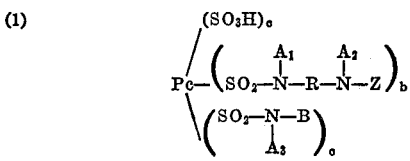

wherein Pc represents a phthalocyanide radical and B represents a radical of the Formula 1a or 1a'

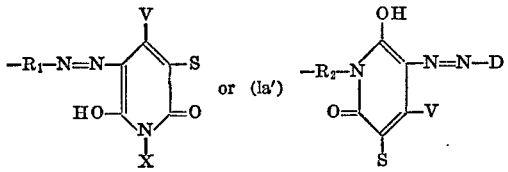

and D represents the radical of a diazo component, which radical preferably contains one or more sulpho groups, and which may also contain one or more reactive radicals, for example a radical of Formula 1a''

as substituent(s), X represents a hydrogen atom, a low molecular weight, optionally substituted, alkyl group or a radical of Formula 1b''

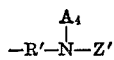

$R_1$ represents an aromatic bridge member or an araliphatic bridge member which is aromatically bonded to the azo bridge, $R_2$ represents an aliphatic or cycloaliphatic bridge member or an araliphatic or heterocyclic bridge member which is aliphatically bonded to the pyridone ring, each of R and R', which may be the same or different, represents an aromatic, alicyclic or aliphatic birdge member, each of Z and Z', which may be the same or different, represents a fibre-reactive group, each of $A_1$, $A_2$, $A_3$ and $A_4$, which may be the same or different, represents a low molecular alkyl or aralkyl radical, preferably containing at most 4 aliphatically bonded C-atoms, or represents a hydrogen atom, S represents a suplhone, sulphonic acid amide, carboxylic acid amide, carboxylic acid ester or nitrile group, V represents a low molecular alkyl or aryl group or a carboxylic acid ester or carboxylic acid amide group, and each of $a$, $b$ and $c$, which may be the same or different, represents an integer or a fractional number, with the proviso that each of $b$ and $c$ must be at least 1.0 and $a+b+c$ must be an integer or fractional number equal to or between 3.0 and 4.0.

The invention more especially provides compounds of the general Formula 1 wherein Pc represents the radical of a copper or nickel phthalocyanine, D represents a sulphobenzene or sulphonaphthalene radical, each of $A_1$, $A_2$, $A_3$ and $A_4$, which may be the same or different, represents a methyl, ethyl, hydroxyethyl or, especially, a hydrogen atom, R, $R_2$, and R', which may be the same or different, represent aliphatic radicals with 1 to 6 carbon atoms, $R_1$ represents a sulphophenylene radical, $a$ represents at least 1.0, $a+b+c=4.0$, and Z represents a heterocyclic reactive radical, especially a fibre-reactive triazine or pyrimidine radical.

As organic radicals represented by X', V' or S', there may be especially mentioned low molecular weight aliphatic, alicyclic, heterocyclic, araliphatic or aromatic radicals, and as modified acid groups there may be mentioned the esters and N-substituted amides thereof which contain the above-mentioned organic radicals, as well as sulphones and ketones, and also unsubstituted amides and the nitrile group. The aliphatic radicals here contain preferably at most 6 carbon atoms and may contain one or more substituents selected from, for example, halogen atoms and alkoxy, acyloxy, nitrile and alkylcarbonyl groups; the aromatic radicals are preferably phenyl radicals, which may contain one or more substituents selected from halogen atoms and alkyl, alkoxy and nitro groups. The benzyl radical may be mentioned as an example of an aralkyl radical, the cyclohexyl radical as an example of an alicyclic radical, and the pyridine radical as an example of a heterocyclic radical.

A particularly preferred dyestuff is a phthalocyanine dyestuff of the formula

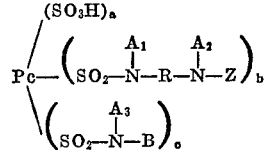

in which Pc is nickel or copper phthalocyanine; $A_1$, $A_2$ and $A_3$ each independently is hydrogen, lower alkyl or hydroxyethyl; R is phenylene, methylenephenylene, ethylenephenylene or diphenylene, each of which is unsubstituted or substituted in the phenylene moiety by one or more of chloro, $C_1$-$C_2$-alkoxy, $C_1$-$C_2$-alkyl or sulfonic acid; or alkylene of 2-6 carbon atoms or cycloalkylene having up to 6 carbon atoms, each of which is unsubstituted or substituted by β-hydroxyethyl, acetyl or carbamyl, ethylenepiperazinylene or R together with $A_1$ and $A_2$ forms piperazinylene or pipidinylene; Z is a cellulose fibre-reactive group capable of reacting with the hydroxyl groups of cellulose to form a covalent bond; B is a group of the formula

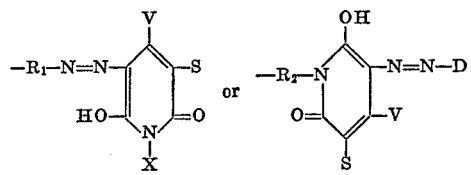

in which $R_1$ is phenylene, methylenephenylene or ethylenephenylene where the phenylene moiety is substituted by at least one of chloro, $C_1$-$C_2$-alkoxy, $C_1$-$C_2$-alkyl or sulfonic acid and wherein the phenyl moiety is bound to the azo group; V is lower alkyl, phenyl, tolyl, carboxylic acid ethyl ester, carboxylic acid benzyl ester, methylene carboxylic acid ethyl ester, carbamyl, N-ethyl carbamyl, or β-cyanoethylene; S is nitrile, carboxylic acid ethyl ester, carbamyl, N,N-dimethylsulfamyl, methylsulfonyl or phenylsulfonyl; X is hydrogen, lower alkyl which is unsubstituted or substituted by amino, hydroxyl, sulfonic acid or β-hydroxyethyleneamine, phenyl, benzyl, cyclohexyl, each of which can be substituted by amino, or X is a group of the formula

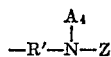

where R' is alkylene of 1 to 6 carbon atoms, cyclohexylene, phenylene or methylenephenylene; $A_4$ is hydrogen or lower alkyl and Z is a fiber-reactive group; $R_2$ is $C_1$-$C_6$-alkylene; D is benzenesulfonate containing one or more sulfonic acid groups and substituted by one or more of chloro, hydroxy, methoxy, methyl, carboxy, acetamido, benzamido, nitro, sulphoacetylamino, trifluoromethyl or aminobenzoyl, or naphthalenesulfonate containing at least one sulfonic acid groups and D can additionally be substituted by a member of group Z is defined above and $a$, $b$ and $c$ ach, independently is an integer or fractional number provided that $b$ and $c$ is each at least 1.0 and the sum of $a+b+c$ is an integer or fractional number between 3.0 and 4.0.

The dyestuffs of the invention may be manufactured by acylation, condensation or coupling. The following processes (a) and (b) are examples of suitable processes.

(a) An amine of the Formula 2a

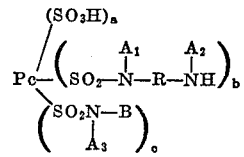

is acylated with a compound of the Formula 2b (2b)            Y—Z or an amine of the Formula 3a (3a)

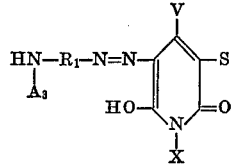

is acylated with a compound of the Formula 3b (3b)

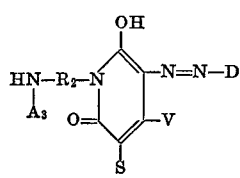

or an amine of Formula 4a or 4a'

(4a)

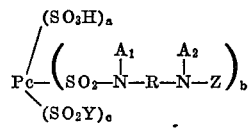

or (4a')

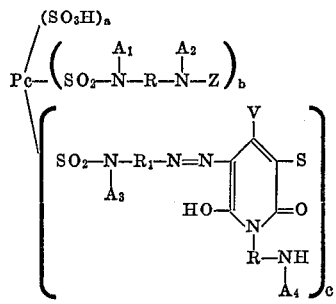

is acylated with a compound of the Formula 4b (4b)

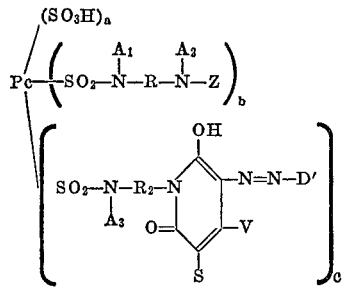

or an amine of the Formula 5a or 5a'

(5a)

$$Pc \begin{pmatrix} (SO_3H)_a \\ (SO_2-N-R-N-Z)_b \\ \phantom{Pc}\begin{bmatrix} SO_2-N-R_1-N=N \overset{V}{\underset{HO}{\diagdown}}\hspace{-2pt}\begin{matrix} S \\ =O \end{matrix} \\ \phantom{SO_2-N-R_1-N=N}\overset{}{\underset{R-NH}{\diagup}}\hspace{-2pt}\begin{matrix} \\ A_4 \end{matrix} \end{bmatrix}_c \end{pmatrix}$$

or (5a')

$$Pc \begin{pmatrix} (SO_3H)_a \\ (SO_2-N-R-N-Z)_b \\ \phantom{Pc}\begin{bmatrix} \phantom{SO_2}\overset{OH}{\phantom{N}} \\ SO_2-N-R_2-N\hspace{-2pt}\diagdown\hspace{-2pt}\begin{matrix} N=N-D' \\ -V \\ S \end{matrix} \end{bmatrix}_c \end{pmatrix}$$

wherein D' represents the radical of a diazo component containing an amino group which can be acylated, is acylated with a compound of the Formula 5b (5b)            Y—Z' in which Formulae 2b, 3b, 4b and 5b Y represents a reactive atom or a reactive group, preferably a bromine atom or, advantageously, a chlorine atom.

(b) A diazotised amine of the Formula 6a or 6a'

(6a)

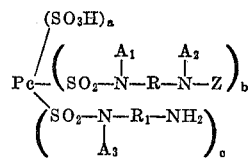

or (6a') D—NH$_2$ is coupled with a coupling component of the Formula 6b or 6b' respectively:

(6b)

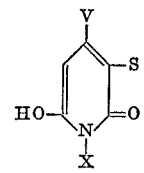

or (6a')

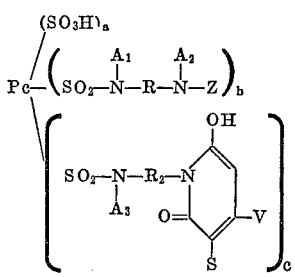

The phthalocyanine sulphohalides which may be used in the manufacture of the starting materials can, for example, be manufactured by reaction of a phthalocyanine containing copper or a phthalocyanine containing nickel with chlorosulphonic acid, or by reaction of a phthalocyanine-tetrasulphonic acid with an acid-halogenating agent, for example, phosphorus halide, thionyl chloride or chlorosulphonic acid.

Depending on the type of process chosen, the sulphonic acid groups in the phthalocyanine molecule are in the 4-position and/or in the 3-position, depending on whether the starting point for their manufacture is 4-sulphophthalic acid or a mixture of 4- and of 3-sulphophthalic acid or whether they are manufactured by sulphonation or by direct sulphochlorination of the phthalocyanine, all four sulpho or sulphochloride groups being bonded in the 3-position in the latter case.

A phthalocyanine-sulphochloride obtained as described above can, for example, first be condensed with a diamine, which is preferably monoacetylated, of the Formula 7a (7a)        H$_2$N—R$_1$—NH$_2$ (for example with a monoacylated araliphatic diamine, for example, acetylaminobenzylamine or aminoethylphenylacetylamine or with unsubstituted or, for example, chlorine-, methoxy-, ethoxy-, methyl- or ethyl-substituted, preferably monoacylated, meta- or para-phenylenediamine or with a meta- or para-phenylenediaminesulphonic acid, preferably with m-phenylenediaminesulphonic acid), or with an amine of the Formula 7b

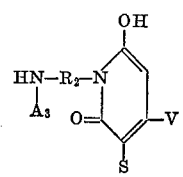

in the presence of an acid-binding agent, and the sulphohalide groups which do not participate in this reaction can simultaneously or subsequently be partially hydrolysed and reacted with an organic, preferably monoacylated, diamine of the Formula 8

(8)                  $H_2N-R-NH_2$ with the proportions of reactants and the reaction conditions chosen in such a way that $a$, $b$ and $c$ have the values given above, that is, in such a way that an intermediate product of the Formula 9a or 9b (9a)
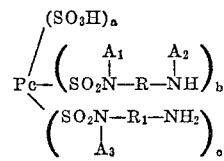

or (9b)
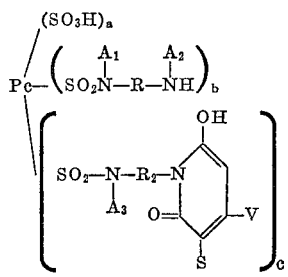

is produced, where appropriate after splitting off the acyl group(s).

As organic diamines of Formula 7a there may be mentioned aromatic diamines, for example phenylenediamines, toluidenediamines, phenylenediaminesulphonic or phenylenediaminecarboxylic acids, for example 4,4'-diaminodiphenyl, 4,4' - diaminostilbene - 2,2' - disulphonic acid, 1,4- or 1,3-diaminobenzene and, above all, 1,4-diaminobenzene-2-sulphonic acid and 1,3-diaminobenzene-4-sulphonic acid, or araliphatic diamines, for example aminosulphobenzylamines. Compounds of Formula 7b and their manufacture are, for example, described in the book "Pyridine and Derivatives," part 3, page 510 etc., by Erwin Klingsberg, Interscience Publishers, 1962, and also in German Offenlegungsschrift No. 1,901,749. The compounds wherein V=methyl and S=nitrile may for example, be obtained by condensation of 1 mol of acetoacetic ester, 1 mol of cyanacetic ester and 1 mol of a diamine, for example, ethylenediamine, N,β-hydroxyethylenediamine, propylenediamine, isopropylenediamine, tetra-, penta-, cyclopenta-, hexa- or cyclohexa-methylenediamine, 4-aminopiperidine, N,β-aminoethylpiperazine, or 4-aminobenzylamine.

As diamines of Formula 8 there may be mentioned the diamines mentioned for 7a, and also heterocyclic diamines, for example aminopiperidine and aminoethylpiperazine, or, above all, aliphatic diamines, especially those containing at most 6 carbon atoms, such as for example ethylenediamine, β - hydroxyethylethylenediamine, propylenediamine, and tetra-, penta-, cyclopenta-, hexa- or cyclohexamethylenediamine.

Instead of the unsubstituted diamines, monoacylated, for example monoacetylated, or monocarbamated derivatives of such diamines are preferably used. In the case of aromatic compounds nitroamines, for examples nitraniline, nitrotoluidine or nitrochloraniline, may also be used. When using such derivatives the amino group must subsequently be liberated by saponification or reduction before it is further reacted.

The phthalocyanine derivatives of Formula 9a obtained in this manner can subsequently, where R is aliphatic and/or the amino group bonded to R is acylated or still replaced by a nitro group, be diazotised and coupled with a coupling component of the Formula 6b given earlier. Thereafter, any acylamino group which may be present is saponified or any nitro group is reduced; the resulting product of Formula 2a is reacted, according to the invention, with a compound of Formula 2b. Correspondingly, the resulting phthalocyanine derivatives of Formula 9b are subsequently coupled with a diazotised amine of formula $D-NH_2$ and any acylamino group which may be present is saponified or any nitro group reduced, and the resulting product of Formula 2a reacted according to the invention with a compound of Formula 2b. The compounds of Formula 2b contain a fibre-reactive radical Z (that is, a radical capable of reacting with a fibre).

As such fibre-reactive groupings —Z, that is to say reactive groupings capable of reaction with the hydroxyl groups of a cellulosic fibre to form a covalent bond, there should for example be mentioned aliphatic radicals, the chloromaleinyl, monochlorocrotonyl and dichlorocrotonyl and dichlorocrontonyl, chloracryl, acryl, chloropropionyl or α,β-dichloropropionyl or α-chloracetyl radicals and the corresponding brominated radicals, and also heterocyclic radicals containing ring nitrogen atoms, for example phthalazine, pyridazine, pyridazone, quinoxaline, quinazoline, oxazole, thiazole, pyrimidine or triazine radicals, which heterocyclic radicals for example may contain one or more removable substituents selected from methylsulphonyl and quaternary amino groups, but especially halogen atoms, for example the grouping of formula

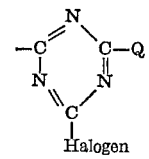

wherein Q represents a hydrogen atom, an optionally substituted amino group, an etherified hydroxyl or mercapto group or a halogen atom, or an alkyl, aryl or aralkyl group. The halogen atoms may, for example, be bromine atoms, but are preferably chlorine atoms.

As acylating agents which can be reacted with the aminoazophthalocyanine dyestuffs manufactured as described above, there may for example be mentioned carbyl sulphate (=1,3,2,4-dioxanedithianedisulphoxide) (in which case the reaction with the amino group takes place with the ring being split open), but above all the acid anhydrides or acid chlorides, corresponding to the formula Y—Z, of the acids which correspond to the aliphatic acylamino radicals mentioned above in connection with —Z, for example acid anhydrides or acid chlorides of acrylic, propiolic, chloromaleic, monochlorocrotonic or dichlorocrotonic, α - chloracrylic, α - bromacrylic, trichloracrylic, β-chloropropionic, α,β-dichloropropionic and α-chloracetic acid, or the corresponding bromine derivatives, and also the acid halides of certain aromatic or cycloaliphatic carboxylic or sulphonic acids, for example 3,5-dinitro-4-chlorobenzene-sulphonic acid or -carboxylic acid, 3-nitro-4-chlorobenzene-sulphonic acid or -carboxylic acid, 2,2,3,3-tetrafluorocyclobutane-1-carboxylic acid, β-(2,2,3,3-tetrafluorocyclobutane-1)-acrylic acid, β-chlorethylsulphonylendomethylenecyclohexane carboxylic acid, or acrylsulphonylendomethylenecyclohexanecarboxylic acid, but above all heterocyclic acid halides, for example, 2-halogenobenzthiazole-, -benzisothiazole- or -oxazole-carboxylic or -sulphonic acid chlorides, for example 2-chlorobenzthiazole-6-carboxylic or -sulphonic acid chloride, 3,6-dichloropyridazine-5-carboxylic acid chloride, 3,6-dichloropyridazine, 2,4,5,6-tetrachloropyridazine, 4,5-dichloropyridazon-(6)-yl-propionic acid chloride, 4,5-dichloro-1-phenylpyridazone-carboxylic or -sulphonic acid chloride,
4,5-dichloropyridazonepropionic acid chloride,
1,4-dichlorophthalazine-carboxylic or -sulphonic acid chloride,
2,3-dichloroquinoxalinecarboxylic or -sulphonic acid chloride,
2,4-dichloroquinazolinecarboxylic or -sulphonic acid chloride,
2,4-dichloropyrimidine,
5-nitro-6-methyl-2,4-dichloropyrimidine,
2,4-dichloropyrimidine-6-carboxylic acid chloride,
2,4-dichloropyrimidine-5-carboxylic acid chloride,
2,4-dichloropyrimidine-5-sulphonic acid,
2,4-dichloro-5-chloromethyl-6-methyl-pyrimidine,
2,4-dichloro-5-nitro-6-methylpyrimidine,
2,4-dibromo-5-bromomethyl-6-methylpyrimidine,
2,4-dichloro-5-chloromethylpyrimidine,
2,4-dibromo-5-bromomethylpyrimidine,
2,6-dichloro- or 2,6-dibromo-4-carbethoxypyrimidine,
2,6-dichloro-4-trichloromethylpyrimidine,
2,6-dichloro- or 2,6-dibromopyrimidine-4- or -5-carboxylic acid or -sulphonic acid amides,
or -4- or -5-carboxylic acid or -sulphonic acid chloride,
2,4,5-trifluoropyrimidine or trichloropyrimidine,
2,5,6-trichloro-4-methylpyrimidine,
2,4,6-trifluoro-, 2,4,6-trichloro- or 2,4,6-tribromopyrimidine and their derivatives which for example carry a nitrile, nitro, methyl, ethyl, carbamide, sulphamide, carbomethoxy, carbalkoxy, acyl (for example benzoyl, acetyl or propionyl), alkenyl (for example allyl or chlorovinyl) or substituted alkyl (for example carboxy-methyl, chloromethyl or bromomethyl) group or a fluorine, chlorine or bromine atom in the 5-position, such as for example, 5-chloro-2,4,6-trifluoropyrimidine,
5-bromo-2,4,6-trichloropyrimidine,
5-acetyl-2,4,6-trichloropyrimidine,
2,4,5,6-tetrafluoro-, tetrachloro- or -tetrabromopyrimidine,
2-methanesulphonyl-4-chloro-6-methylpyrimidine,
2-methanesulphonyl-4,5-dichloro-6-methylpyrimidine,
2,4-dimethanesulphonyl-6-methylpyrimidine, and
2,4-dimethanesulphonyl-5-chloro-6-methylpyrimidine,
2,6-dimethanesulphonylpyrimidine-4-carboxylic acid chloride,
2,4,6-trifluoro- or -trichloro- or -tribromo-1,3,5-triazine, and
4,6-dichloro-1,3,5-triazines, which are substituted in the 2-position by an aryl or alkyl radical, for example a phenyl, methyl or ethyl radical, or by the radical of an aliphatic or aromatic mercapto compound bonded via the sulphur atom or hydroxy compound bonded via the oxygen atom, or especially by a —NH₂ group or by the radical of an aliphatic, heterocyclic or aromatic amino compound bonded via the nitrogen atom.

As such compounds, the radicals of which can be bonded in the 2-position to the triazine nucleus by reaction with trihalogenotriazines, the following may, for example, be mentioned: aliphatic or aromatic mercapto or hydroxy compounds, for example thioalcohols, thioglycollic acid, thiourea, thiophenols, alcohols, for example methanol, ethanol, butanol, isobutanol, pentanol, isopentanol, 2-methyl-1-butanol, hexanol, 2,2-dimethyl-1-pentanol, 2-chloroethanol, 3-chloro-1-propanol, 2-methoxyethanol, 2-ethoxyethanol, 2-propoxyethanol, 2-n-butoxyethanol, 3-methoxypropanol, 2-methoxypropanol, 3-methoxypropanol, 3-methoxy-1-butanol, 2-(2-methoxyethoxy)-ethanol, 2 - (2-ethoxyethoxy)-methanol, 2-ethylmercaptoethanol, 2-phenoxy-ethanol, cyclohexanemethanol, benzyl alcohol, 2-hydroxyethyl acetate, furfuryl alcohol, tetrahydrofurfuryl alcohol, 2-buten-1-ol, glycollic acid; isopropanol, sec. butanol, 2-hexanol, 1,3-diethoxy-2-propanol, 2-methoxy-isopropanol, 3-methyl-2-butanol, cyclopentanol, cyclohexanol, 2-methyl-cyclohexanol, furoin, 3-hydroxytetrahydrofuran, tertiary butanol, phenol, chlorophenols or nitrophenols, phenolcarboxylic acids and phenolsulphonic acids, naphthols, naphtholsulphonic acids, but especially ammonia and compounds containing amino groups which can be acylated, for example hydroxylamine, hydrazine, phenylhydrazine, phenylhydrazinesulphonic acids, carbamic acid and its derivatives, semicarbazides and thiosemicarbazides and semicarbazones and thiosemicarbazones, methylamine, ethylamine, isopropylamine, methoxyethylamine, methoxypropylamine, dimethylamine, diethylamine, methylphenylamine, ethylphenylamine, chlorethylamine, sulphatoethylamine, ethanolamines, propanolamines, benzylamine, cyclohexylamine, morpholine, piperidine, piperazine, aminocarbonic acid esters, aminoacetic acid ethyl ester, aminoethanesulphonic acid and N-methylaminoethanesulphonic acid, but above all aromatic amines, for example aniline, N-methylaniline, toluidines, xylidines, chloranilines, p- and m-aminoacetanilide, nitranilines, aminophenols, nitrotoluidines, phenylenediamines, toluylenediamines, anisidine, phentidine, diphenylamine, naphthylamine, aminonaphthols, diaminonaphthalenes and especially anilines containing acid groups, for example, sulphanilic, metanilic and orthanilic acid, anilinedisulphonic acid, aminobenzylsulphonic acid, aniline-ω-methanesulphonic acid, aminodibenzoic acid, naphthylaminomono-, -di- and tri-sulphonic acids, aminobenzoic acids, such as 1- or 2-hydroxy-5-aminobenzoic acid, aminonaphtholmono-, -di- and -tri-sulphonic acids, aminobenzoic acid-sulphonic acid, and also coloured compounds, or compounds possessing dyestuff character, for example 4-nitro-4' - amino - stilbenedisulphonic acid, 2 - nitro - 4'-aminodiphenylamino - 4,3' - stilbenedisulphonic acid, 2-nitro-4'-aminodiphenylamine-4,3'-disulphonic acid and especially aminoazo dyestuffs or aminoanthraquinones or phthalocyanines which still contain at least one reactive amino group.

The condensation or acylation according to the invention takes place according to methods which are commonly used in the art, in an aqueous medium in the presence of an acid-binding agent, for example sodium acetate, sodium hydroxide or sodium carbonate, and under such conditions that at least one replaceable halogen atom still remains in the finished product, that is, for example, in the presence of an organic solvent or at relatively low temperatures in an aqueous medium. Advantageously, a small excess of the acylating agent over the amount theoretically required for complete acylation of aromatically or aliphatically bonded —NH₂ groups present in the starting phthalocyanine is used.

The introduction of the triazine radicals substituted in the 2-position by the radical of a mercapto or amino compound or ammonia can also be carried out by first reacting with a 2,4,6-trihalogeno-1,3,5-triazine, especially cyanuryl chloride, and subsequently replacing a halogen atom in the resulting dihalogenotriazine radical or radicals by reaction with a compound, or with different compounds, from amongst those mentioned above.

Furthermore it is possible, in the dystuffs manufactured as indicated which possess a β-chloropropionyl, α,β-dichloropropionyl or dibromopropionyl radical, to convert these radicals subsequently, in accordance with the invention, into an unsaturated acyl radical, for example an acryl, a chloroacryl or a bromacryl radical, by splitting off hydrogen halide by means of an agent with an alkaline reaction.

A further possible procedure for the manufacture of the intermediate products comprises first reacting a phthalocyaninesulphochloride with an azo dyestuff of Formula 4a or 4a' obtained by diazotisation and coupling of a diamine, or with a diamine of Formula 3a which is already reactively monoacylated, and thereafter allowing the resulting phthalocyanine compound of Formula 3b or 4b to react with an amine of one of the Formulae 3a, 4a and 4a', Finally, a further possible method of manufacture by acylation comprises first manufacturing a compound of Formula 5a or 5a' in accordance with one of the above-mentioned methods and subsequently acylating this compound with a compound of Formula 5b as indicated earlier. The acylating agent Y–Z' used in this process may be the same as, or different from Y–Z and in this process it is again possible subsequently to replace a halogen atom in a triazine ring which may be present or to split off hydrogen halide in an aliphatic radical which may be present. If Z and Z' are identical, it is also possible to combine the methods given above the formulae (2a/b) and (4a/b) or (4a'/b), that is to say first to manufacture a compound of Formula 5a or 5a', wherein, however, Z is replaced by a hydrogen atom, and thereafter to acylate this compound with the amount of the compound Y–Z or Y–Z' which corresponds to the amino groups.

The dyestuffs of the invention can also be manufactured by diazotisation of an amine of Formula 6a or 6a', the former being obtainable as indicated earlier, and coupling with a coupling component of Formula 6b or 6b' respectively. Compounds of Formula 6b are described in the literature references indicated earlier when discussing the compounds of Formula 6b. The compounds wherein V=methyl and S=nitrile may, for example, be obtained by condensation of 1 mol of an amine, ester, 1 mol of cyanacetic ester and 1 mol of an amine, for example, methylamine, ethylamine, isopropylamine, methoxyethylamine, methoxypropylamine, chloroethylamine, ethanolamines, propanolamines, benzylamine, cyclohexylamine, an aromatic amine, for example aniline, toluidine, xylidine, chloraniline, p- or m-aminoacetanilide, aminophenols, phenylenediamines, toluylenediamines, anisidine, phenetidine, diphenylamine, naphthylamine, aminonaphthols, diaminonaphthalenes, aminobenzyl amine, aminopiperidine, aminopiperazine, ethylenediamine, $\beta$ - hydroxyethylethylenediamine, propylenediamine, and tetra-, penta-, cyclopenta-, hexa- or cyclohexamethylenediamine.

As examples of amines of Formula 6a' of which the diazo compound can be used for coupling, there may be mentioned:

1-aminobenzene, 1-aminobenzene-2-, -3- or -4-sulphonic acid,
1-aminobenzene-2-, -3- or -4-carboxylic acid,
2-amino-1-methoxybenzene-4-sulphonic acid,
3-amino-2-hydroxybenzoic acid-5-sulphonic acid,
3-amino-6-hydroxybenzoic acid-5-sulphonic acid,
2-aminophenol-4-sulphonic acid,
1-acetylamino-4-aminobenzene-2,5-disulphonic acid,
4- or 5-acetylamino-2-aminobenzene-1-sulphonic acid,
5-chlor-2-aminobenzene-1-sulphonic acid,
4- or 5-nitro-2-aminobenzene-1-sulphonic acid,
4- or 5-methyl-2-aminobenzene-1-sulphonic acid,
4- or 5-$\beta$-sulphoacetylamino-2-aminobenzene-1-sulphonic acid,
4- or 5-methoxy-2-aminobenzene-1-sulphonic acid,
4-trifluoromethyl-2-aminobenzene-1-sulphonic acid,
4-methyl-5-chlor-2-aminobenzene-1-sulphonic acid,
5-methyl-4-chlor-2-aminobenzene-1-sulphonic acid,
4-methoxy-5-chlor-2-aminobenzene-1-sulphonic acid,
4-acetylamino-5-methyl-2-aminobenzene-1-sulphonic acid,
4,5-dichlor-2-aminobenzene-1-sulphonic acid,
3,5- or 4,5-dimethyl-2-aminobenzene-1-sulphonic acid,
3,5-dimethoxy-2-aminobenzene-1-sulphonic acid,
5-acetylamino- or 5-benzoylamino-2-aminobenzene-1-carboxylic acid,
2-aminobenzoic acid-4- or 5-sulphonic acid,
1-aminonaphthalene-2-, -4-, -5-, -6- or -7-sulphonic acid,
2-aminonaphthalene-4-, -6-, -7- or -8-sulphonic acid,
1-aminonaphthalene-3,6-disulphonic acid,
1-aminobenzene-2,4- -2,5- or -3,6-disulphonic acid,
1-amino-6-methylbenzene-2,4-disulphonic acid,
1-aminobenzene-2,4,6-trisulphonic acid,
1-aminonaphthalene-3,6-disulphonic acid,
2-aminonaphthalene-3,6-, -4,8-, -5,7- or -6,8-disulphonic acid,
1-(3'- or 4'-aminobenzoyl)-aminobenzene-3-sulphonic acid,
3-aminopyrene-8- or -10-monosulphonic acid,
3-aminopyrene-5,8- or 5,10-disulphonic acid,
4-amino-4'-acetylaminodiphenyl-3-sulphonic acid,
4-aminodiphenyl-3,4'-disulphonic acid,
4-aminostilbene-2,2'-disulphonic acid,
4-amino-4'-chlorostilbene-2,2'-disulphonic acid,
4,4'-aminostilbene-2,2'-disulphonic acid,
1-naphthylamine-2,4,7-, 2,4,8-, -2,5,7-, -3,6,8- or -4,6,8-trisulphonic acid,
2-naphthylamine-1,3,7-, -1,5,7-, -4,6,8- or -3,6,8-trisulphonic acid, and also O-acyl derivatives of aminonaphtholsulphonic acids, for example the O-acyl derivatives of 1-amino-8-hydroxynaphthalene-3,6, or -4,6-disulphonic acid, dehydrothiotoluidine-monosulphonic or di-sulphonic acid, 2-(4''-amino -2'',2'''-disulphostilbenzyl)-mono-, -di- or tri-sulphonaphtho-1',2':4,5-triazole and the like.

As amines of formula D—NH$_2$ it also possible to use aminoazo dyestuffs, such as for example 4-amino-1,1'-azobenzene-3,4'-disulphonic acid, and those which are obtained by coupling a diazo compound of one of the amines mentioned with coupling components possessing NH$_2$ groups and preferably containing sulphonic acid groups.

Furthermore, it is also possible to use, as diazo components of formula D—NH$_2$, those which already possess a fibre-reactive group, for example 4-($\beta$-sulphatoethyl)-sulphonylaniline, 2-methyl-5-($\beta$-sulphatoethyl)-sulphonylaniline, 1-aminobenzene-4-sulphonic acid-N-sulphatoethylamide or 4-N-methyl-N-($\beta$-sulphatoethylsulphonyl)-aminoaniline, or those which are obtained from 1,4- or 1,5-diaminobenzene-2,5-disulphonic acid, 1,3-diaminobenzene-4,6-disulphonic acid or 2,6-diaminonaphthalene-4,8-disulphonic acid by reaction with one of the acylating agents of the formula Y—Z given above and which release a fibre-reactive radical.

Apart from those which can be introduced by acylation, further fibre-reactive radicals which may be mentioned are, for example, the vinylsulphone, the $\beta$-sulphato- or thiosulphato-ethylsulphone, $\beta$-thiosulphatopropionylamide, $\beta$-thiosulphatoethylsulphonylamide or sulphonic acid-N,$\beta$-sulphatoethylamide groups, which are introduced itno the diazo component in a different manner, for example by ester or thioester formation.

As such compounds which contain a fibre-reactive radical which can not be introduced by acylation and in which the fibre-reactive radical is thus preferably not bonded via an amino group but directly bonded to the benzene radical, the sulpho-esters of the following sulphones may especially be mentioned:

1-amino-2-methoxy-5-($\beta$-hydroxyethyl)-phenylsulphone,
1-aminobenzene-3- or 4-$\beta$-hydroxyethylsulphone,
1-amino-2-methyl-benzene-5-$\beta$-hydroxyethylsulphone,
1-amino-4-($\beta$-hydroxyethylsulphonylpropionylaminomethyl)-benzene,
1-amino-4-($\beta$-hydroxyethylsulphonylamino)-benzene, and also the reactive compounds obtainable via appropriate methylols according to Einhorn, for example 1-amino-4-chloracetylaminomethylbenzene or 1-amino-3-chloracetylaminomethylbenzene-6-sulphonic acid.

The diazotisation of the diazo components of Formula 6a or 6a' which have been mentioned can be carried out according to methods which are in themselves known, for example with the aid of a mineral acid, especially hydrochloric acid, and sodium nitrite, or for example by means of a solution of nitrosylsulphonic acid in concentrated sulphuric acid.

The coupling can also be carried out in a manner which is in itself known, for example in an alkaline to weakly acid medium, optionally in the presence of sodium acetate or similar buffer substances which influence the coupling speed, or catalysts, for example pyridine or its salts.

The dyestuffs obtained according to the invention are preferably isolated by salting-out and filtering. The isolated dyestuffs can optionally be dried after addition of extenders or stabilisers; the drying is preferably effected at temperatures which are not too high, and under reduced pressure. By spray drying of the total mixture from the manufacturing process it is in certain cases possible to manufacture dry preparations directly, that is to say without intermediate isolation of the dyestuffs. This method yields new valuable dry preparations which are suitable for the manufacture of stock solutions or dyebaths, and, in some cases, for the manufacture of printing pastes.

The dyestuffs of the invention are suitable for dyeing and printing the most diverse material, for example, silk, wool and polyamide fibres, but especially polyhydroxylated materials of fibrous structure. Both synthetic fibres, for example fibres of regenerated cellulose or viscose fibres, and natural materials, for example linen or, above all, cotton may be dyed or printed. Many of the dyestuffs of the invention possess a high affinity for, and therefore good absorption on, the nitrogen-containing materials mentioned above, even in a weakly acid to acid bath. The dyeings thereby obtained, in particular the wool dyeings, are distinguished by good fastness to washing and fulling.

The dyestuffs of the invention are suitable for dyeing cellulose by padding according to the so-called pad dyeing process, according to which the goods are impregnated with aqueous dyestuff solutions, optionally also containing salt, and the dyestuffs are fixed on the goods to be dyed by an alkali treatment, preferably with heating. They are, however, particularly suitable for direct dyeing by the exhaustion process from a dilute liquor. The dyeings obtained with the dyestuffs of the invention are as a rule distinguished by good fastness to rubbing, ironing and light and, above all, by excellent wet fastness properties, for example, fastness to fulling, washing, water, seawater, perspiration, boiling soda, acid, alkali and mercerising. The dyestuffs possess a very good build-up capacity on cotton and especially, on rayon and yield pure, brilliant and intense green dyeings. In addition, the nickel phthalocyanine dyestuffs according to the application in particular yield dyeings having very good wet fastness to light.

The printing process also yields valuable and fast prints on cellulose fibres if the dyestuffs are fixed on the printed goods by heat treatment in the presence of alkali.

After dyeing or after printing it is advisable to remove the non-fixed dyestuff as completely as possible. In order to do this, the dyeings and prints are rinsed thoroughly with warm and cold water and subjected to a soaping process in the presence of non-ionic dispersing agents and/or wetting agents.

The following examples illustrate the invention. Parts and percentages given in the examples are by weight unless otherwise specified.

EXAMPLE 1

An amount of the compound of the formula

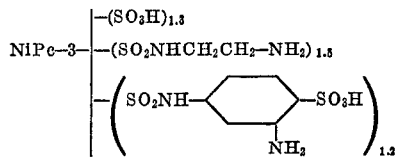

the manufacture of which is described below, which reacts with 60 parts by volume of 2 N sodium nitrite solution is dissolved in 2000 parts of water, with addition of sodium hydroxide, to give a neutral solution, and the solution is cooled to 0° C. 63 parts by volume of 2 N sodium nitrite solution followed by 40 parts by volume of concentrated hydrochloric acid are added with thorough stirring. Any excess of nitrite is destroyed with sulphamic acid after stirring for two hours at 5 to 10° C.

An aqueous alkaline solution of 19.9 parts of 2,6-dihydroxy-4-methyl-3-cyanopyridine is now added to the resulting suspension of the diazo compound. The coupling mixture is thereafter rendered weakly acid to neutral with sodium hydroxide solution.

After completion of coupling, an aqueous neutral solution is added which contains 41 parts of the compound of the formula

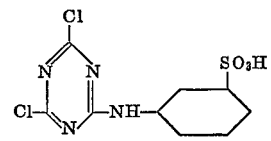

The mixture is warmed to 40 to 50° C. and is kept at pH 6.8 to 7.2 by dropwise addition of dilute sodium hydroxide solution. The dyestuff of the formula

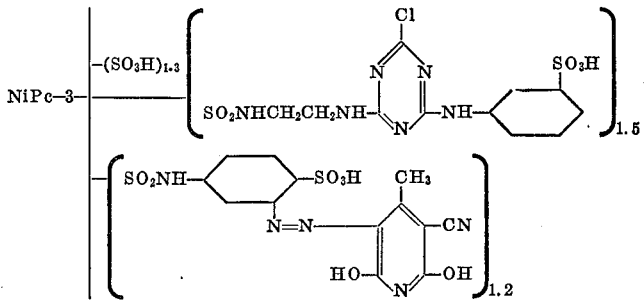

is precipitated after completion of condensation by adding sodium chloride, filtered off and dried in vacuo. This dyestuff dyes cellulose fibres in brilliant light-fast and wet-fast green shades.

The phthalocyaninediazo component used is manufactured as follows:

Nickel-phthalocyanine - trisulphochloride - monosulphonic acid (obtained in a known manner from 57 parts of chlorosulphonic acid at 130 to 140° C. and subsequent pouring onto ice), in the form of an acid paste, is stirred into 500 parts of ice water. 24.5 parts of 1,3-phenylenediamine-4-sulphonic acid and 19.8 parts of ethylenediamine-monocarbamate are successively added. The reaction mixture is stirred for 20 hours at 20 to 25° C. and is kept at pH 6 by dropwise addition of dilute sodium hydroxide solution. The temperature is then raised to 50 to 55° C. and the pH to 7. After completion of the condensation, solid sodium hydroxide is added up to a concentration of 5%. The subsequent saponification takes place by stirring for four hours at 90 to 95° C. Thereafter concentrated hydrochloric acid is added until a strongly acid reaction to Congo Red is obtained. The product is completely precipitated by means of sodium chloride, filtered off at 30° C. and washed with 5% strength hydrochloric acid until no further diazotisable amine is detectable in the filtrate.

A dyestuff with similar good properties is obtained when starting from copper-phthalocyanine instead of nickel-phthalocyanine. It dyes cellulose fibres in less yellowish-tinged green shades.

EXAMPLE 2

The intermediate dyestuff described in the first two paragraphs of Example 1 is mixed with an alcoholic solution of 32.7 parts of tetrachloropyrimidine, with thorough stirring, and acylated at 60 to 90° C. In the course of this, the pH-value is kept at 6.5 to 7.2 by dropwise addition of dilute sodium hydroxide solution. After completion of the acylation, the dyestuff is separated out by addition of sodium chloride, filtered off and dried in vacuo. It dyes cellulose fibres in wet-fast and light-fast green shades.

EXAMPLE 3

The phthalocyaninediazo compound described in the first paragraph of Example 1 is coupled, in the manner described in the second paragraph of Example 1, with 23.1 parts of the compound of the formula

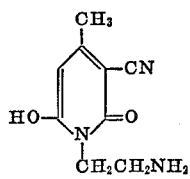

Thereafter the coupling mixture is treated with a solution of 70 parts of 2,4-dichlor-6-(β-ethoxy)-ethoxy-1,3,5-triazine in acetone. The mixture is warmed to 35 to 45° C. and a pH-value of 6.8 to 7.2 is maintained by dropwise addition of dilute sodium hydroxide solution. After completion of the acylation, the dyestuff of the formula

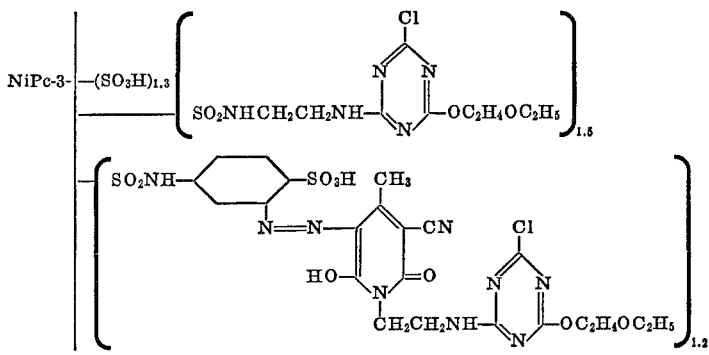

is precipitated by adding sodium chloride, filtered off and dried in vacuo. It dyes cellulose fibres in wet-fast and light-fast green shades.

EXAMPLE 4

The phthalocyaninediazo compound described in the first paragraph of Example 1 is coupled, in a manner analogous to that described in the second paragraph of Example 1, with 19.7 parts of the compound of formula

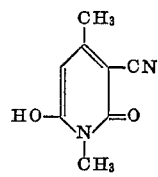

Thereafter the coupling mixture is treated with a solution of 30 parts of 2,4-dichloro-6-methoxy-1,3,5-triazine in acetone. The mixture is warmed to 35 to 45° C. and a pH-value of 6.8 to 7.2 is maintained by dropwise addition of dilute sodium hydroxide solution. After completion of the acylation, the dyestuff is precipitated by adding sodium chloride, filtered off, and dried in vacuo. It dyes cellulose fibres in light-fast and wet-fast green shades.

Dyestuffs with similar properties, which also dye cotton and rayon in green shades, are obtained if the phthalocyanine intermediate products quoted in column I in the following table are diazotised, coupled with the compounds indicated in column II, and then acylated with the acylating agents quoted in column III, in a manner analoguos to that described in Examples 1 to 4. The resulting dyestuffs dye cotton and rayon fibres in wet-fast and light-fast green shades.

| | I | II | III |
|---|---|---|---|
| 1 | NiPc—3—$\begin{cases}-(SO_3H)_{1.3}\\-(SO_2NHCH_2CH_2NH_2)_{1.5}\\-\left(SO_2NH-\bigcirc\!\!\!\!\!-SO_3H\atop\quad NH_2\right)_{1.2}\end{cases}$ | $\underset{\underset{N}{\|}}{\overset{CH_3}{\bigcirc}}\!\!\!\begin{matrix}-CN\\-OH\end{matrix}$ HO— —OH | 2,4-dichloro-6-phenylamino-1,3,5-triazine-2',5'-disulphonic acid. |
| 2 | Same as above | Same as above | 2,4-dichloro-6-phenylamino-1,3,5-triazine-2'-carboxy-5'-sulphonic acid. |
| 3 | do | do | 2,4-dichloro-6-(β'-sulphethyl-amino)-1,3,5-triazine. |
| 4 | do | do | 2,4-dichlor-6-amino-triazine. |
| 5 | do | do | 2,4-dichloro-6-methoxy-triazine. |
| 6 | do | do | 2,4-dichloro-6-propoxy-triazine. |
| 7 | do | do | 2,4-dichloro-6-isopropoxy-triazine. |
| 8 | do | do | 2,4-dichlor-6-(β-ethoxy)-ethoxy-triazine. |
| 9 | do | do | Cyanuryl chloride. |
| 10 | do | do | 2,4,5,6-tetrachloro-pyrimidine. |
| 11 | do | do | 2,4,6-trichloro-pyrimidine. |
| 12 | do | do | 2,3-dichloroquinoxaline-6-carboxylic acid chloride. |
| 13 | do | do | 2-methylsulphonyl-4,5-dichloro-6-methyl-pyrimidine. |
| 14 | do | do | α,β-dibromopropionic acid chloride. |
| 15 | do | do | Tetrafluorocyclobutanecarboxylic acid chloride. |

| | I | II | III |
|---|---|---|---|
| 16 | do | 4-methyl-3-cyano-6-hydroxy-1-(2-hydroxyethyl)-2-pyridone | 2,4-dichloro-6-phenylamino-3'-sulphonic acid. |
| 17 | do | Same as above | 2,4-dichloro-6-methoxy-triazine. |
| 18 | do | do | 2,4-dichlor-6-(β'-ethoxy)-ethoxy-triazine. |
| 19 | CuPc—3—[—(SO$_3$H)$_{1.4}$ / —(SO$_2$NHCH$_2$CH$_2$NH$_2$)$_{1.5}$ / —(SO$_2$NH–C$_6$H$_9$(NH$_2$)–SO$_3$H)$_{1.1}$] | 4-methyl-3-cyano-6-hydroxy-1-(2-aminoethyl)-2-pyridone | 2,4-dichloro-6-phenylamino-triazine-2',5'-disulphonic acid. |
| 20 | Same as above | 4-methyl-3-cyano-6-hydroxy-1-(6-aminohexyl)-2-pyridone | Do. |
| 21 | do | 4-methyl-3-cyano-6-hydroxy-1-[(4-aminocyclohexyl)methyl]-2-pyridone | Do. |
| 22 | NiPc—3—[—(SO$_3$H)$_{1.5}$ / —(SO$_2$NHCH$_2$CH$_2$NH$_2$)$_{1.3}$ / —(SO$_2$NH–C$_6$H$_9$(NH$_2$)–SO$_3$H)$_{1.2}$] | 4-methyl-3-carbamoyl-6-hydroxy-1-ethyl-2-pyridone | Do. |
| 23 | Same as above | 4-methyl-3-carbamoyl-6-hydroxy-1-(2-aminoethyl)-2-pyridone | Do. |
| 24 | NiPc—3—[—SO$_3$H / —SO$_2$NHCH$_2$CH$_2$NH$_2$ / —SO$_2$NH–C$_6$H(CH$_3$)$_3$(NH$_2$)–SO$_3$H] | 4-methyl-3-cyano-6-hydroxy-1-(2-sulfatoethyl)-2-pyridone | Do. |
| 25 | Same as above | 4-methyl-3-cyano-6-hydroxy-1-[2-(2-hydroxyethylamino)ethyl]-2-pyridone | Do. |

| I | II | III |
|---|---|---|
| 26 ... NiPc—3—[—(SO₃H)$_{1.5}$, —(SO₂NHCH₂CH₂NH₂)$_{1.5}$, —(SO₂NH—C₆H₃(NH₂)—SO₂H)$_{1.2}$] | 1-(4-aminophenyl)-3-cyano-4-methyl-6-hydroxy-2-pyridone | Do. |
| 27 ... Same as above | 4-phenyl-3-cyano-2,6-dihydroxypyridine | Do. |
| 28 ... do | 4-(3-methylphenyl)-3-cyano-2,6-dihydroxypyridine | Do. |
| 29 ... do | 4-COOC₂H₅-3-CN-2,6-dihydroxypyridine | Do. |
| 30 ... do | 4-CH₂COOC₂H₅-3-CONH₂-2,6-dihydroxypyridine | Do. |
| 31 ... do | 4-CONH₂-3-CN-2,6-dihydroxypyridine | Do. |
| 32 ... do | 4-CH₃-3-COOC₂H₅-2,6-dihydroxypyridine | Do. |
| 33 ... NiPc—4—[—(SO₃H)$_{1.7}$, —(SO₂NHCH₂NH₂)$_{1.3}$, —SO₂NHCH₂—C₆H₄—NH₂] | 4-COOC₂H₅-2,6-dihydroxypyridine | Do. |
| 34 ... Same as above | 4-CONHC₂H₅-2,6-dihydroxypyridine | Do. |
| 35 ... do | 4-C₂H₄CN-3-SO₂N(CH₃)₂-2,6-dihydroxypyridine | Do. |

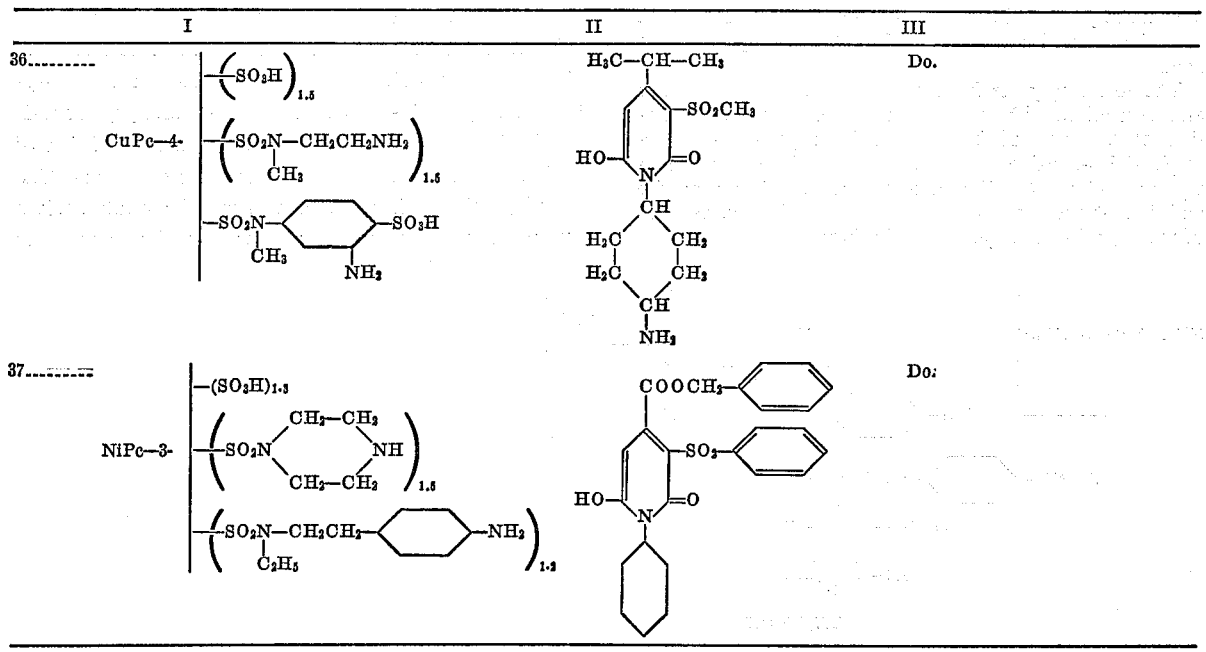

EXAMPLE 5

If in Examples 1 to 4 the compound used as the starting material (see the formula indicated in paragraph 1 of Example 1) is replaced by the compound of formula

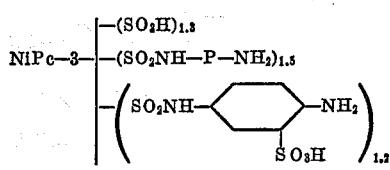

wherein P represents a propylene radical, and in other respects the same procedure is followed, green dyestuffs with similar properties are obtained.

EXAMPLE 6

If the starting product indicated in Example 5 is replaced by compounds of the corresponding formula wherein P represents butylene, pentylene, hexylene or piperazinylene, and in other respects the procedure indicated in Examples 1 to 4 is followed, green dyestuffs with similar properties are again obtained.

Green dyestuffs with similar properties are also obtained if the nickel-phthalocyanine(3) is replaced by the copper-phthalocyanine(3). Somewhat more yellowish-tinged green dyestuffs with otherwise similar properties are obtained if the nickel-phthalocyanine(3) is replaced by nickel- or copper-phthalocyanine(4).

EXAMPLE 7

96.5 parts of nickel-phthalocyanine-tetrasulphochloride (obtained in a known manner by stirring nickel-phthalocyanine with chlorosulphonic acid, with the addition of thionyl chloride, at elevated temperature and subsequently pouring onto ice) are well stirred with 750 parts of ice water. 28.2 parts of 1,3-phenylenediamine-4-sulphonic acid 22.5 parts of 3-aminoacetanilide and 5 parts of pyridine are then added. The mixture is stirred for 20 hours at room temperature, and then for 10 hours at 40 to 45° C., being kept continuously at pH 6 by dropwise addition of dilute sodium hydroxide solution. The reaction mixture is thereafter mixed with 20 parts of concentrated hydrochloric acid and 240 parts of sodium chloride at 20° C. The product which precipitates, of the formula

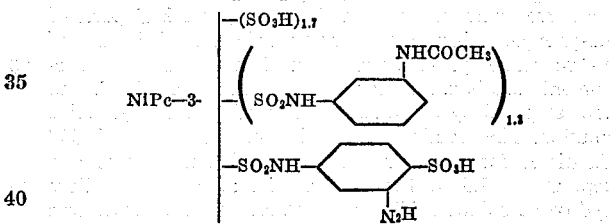

is filtered off and washed with a mixture of 9 parts by volume of 20% strength sodium chloride solution and 1 part by volume of concentrated hydrochloric acid until no further amine is detectable in the filtrate.

The resulting acid paste is stirred with 1400 parts of water and adjusted to pH 7.5 with sodium hydroxide solution. 55 parts by volume of 2 N sodium nitrite are added and the whole is mixed with ice and 50 parts by volume of concentrated hydrochloric acid. After two hours stirring at 5 to 10° C. any excess of nitrite is destroyed with sulphamic acid.

19.4 parts of 1-(β-hydroxyethyl)-3-cyano-4-methyl-6-hydroxy-pyridone-2 are dissolved in water with the addition of sodium hydroxide and added to the diazo suspension. The coupling mixture is neutralised with dilute sodium hydroxide solution and stirred for some hours at 10 to 20° C. Solid sodium hydroxide is then added until a 5% strength solution thereof is produced, and the mixture is then stirred for 4 hours at 90 to 95° C. The cool solution is mixed with concentrated hydrochloric acid until the intermediate dyestuff of the formula

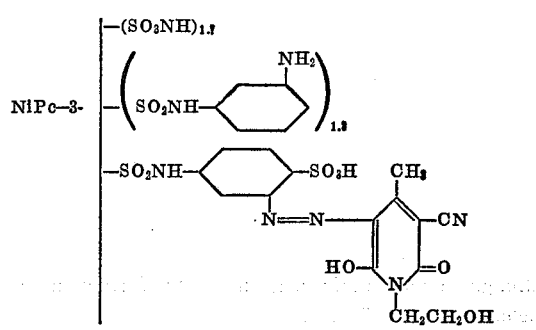

has entirely precipitated. It is filtered off and washed with 500 parts by volume of 5% strength hydrochloric acid.

The resulting paste is stirred with 1600 parts of water and neutralised with sodium hydroxide. An aqueous solution of 60 parts of 2,4-dichloro-6-phenylamino-2',5'-disulpho-1,3,5-triazine is added thereto. The mixture is warmed to 30 to 40° C. and kept at pH 6 to 7 by dropwise addition of sodium hydroxide solution. After completion of the acylation, the dyestuff of the formula

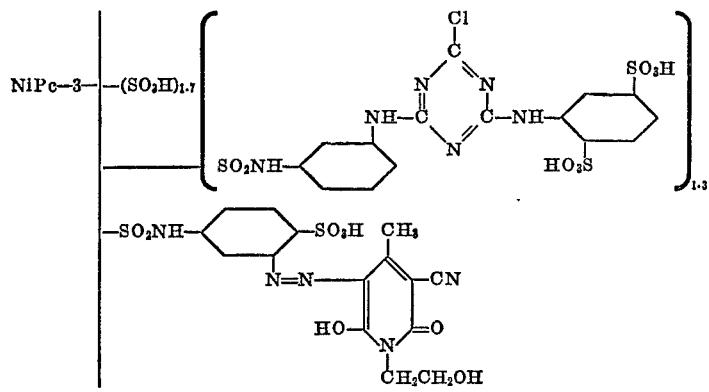

is precipitated with sodium chloride, filtered off and dried. It dyes cellulose fibres in bluish-tinged green shades.

EXAMPLE 8

96.5 parts of nickel-phthalocyanine-tetrasulphochloride are stirred with 700 parts of ice water, and 24.5 parts of 1,3-phenylenediamine-4-sulphonic acid and 19.4 parts of N-(β-aminoethyl)-piperazine are then added. The reaction mixture is stirred for 20 hours at 20 to 25° C. and kept at pH 6 by dropwise addition of sodium hydroxide solution. The reaction mixture is then warmed to 50–55° C., stirred for a further 10 hours at this temperature, and kept at pH 7.5 by further dropwise addition of sodium hydroxide solution. Thereafter concentrated hydrochloric acid is added until pH 2 is reached, and the product of formula

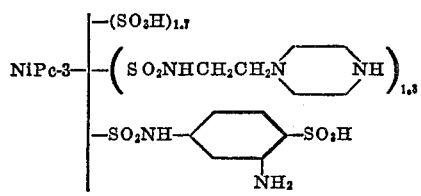

which precipitates is filtered off and washed with 5% strength hydrochloric acid until no further amine is detectable in the filtrate.

The resulting paste is stirred with 1400 parts of water, adjusted to pH 7.5 with sodium hydroxide solution and diazotised as described in Example 7. 19.4 parts of 1-(β-hydroxyethyl) - 3 - cyano-4-methyl-6-hydroxypyridone-2, which have been dissolved in water with the addition of sodium hydroxide, are added to the diazo suspension. The coupling mixture is rendered neutral with dilute sodium hydroxide solution and stirred for some hours at 10 to 20° C. After completion of coupling, the intermediate dyestuff of formula

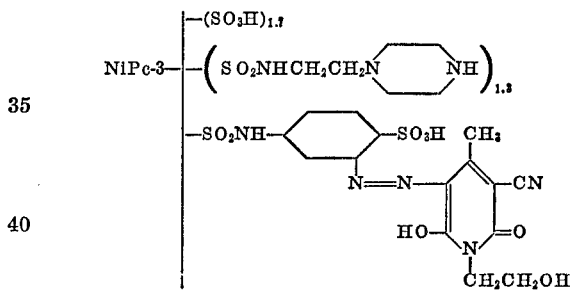

is filtered off and washed with 5% strength sodium chloride solution.

The resulting paste is stirred into 2000 parts of water. An aqueous solution of 60 parts of 2,4-dichloro-6-phenylamino-2',5'-disulpho-1,3,5-triazine is added thereto. The mixture is warmed to 35–40° C. and kept at pH 7.5 to 8.0 by dropwise addition of dilute sodium hydroxide solution. After completion of the acylation, the dyestuff of the formula

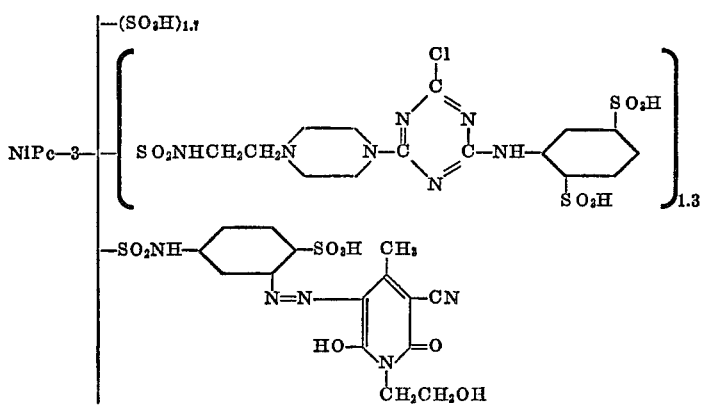

is precipitated by adding sodium chloride and then filtered off and dried. It dyes cellulose fibres in brilliant green shades having good light fastness and wet fastness properties.

If instead of the N-(β-aminoethyl)-piperazine mentioned in the first paragraph of this example, an equivalent amount of N-(β-hydroxyethyl)-ethylenediamine or 4-aminopiperidine is used and in other respects the same procedure is followed, green dyestuffs with similar good properties are obtained.

EXAMPLE 9

96.5 parts of nickel-phthalocyanine-tetrasulpho-chloride are stirred with 1000 parts of ice water. An aqueous suspension of 47.2 parts of the azo dyestuff of the formula

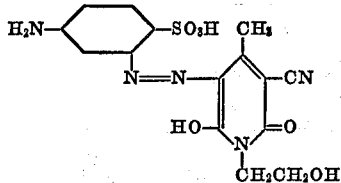

as well as 28.2 parts of 1,3-phenylenediamine-4-sulphonic acid and 10 parts of pyridine are added thereto. The mixture is stirred for 5 hours at 20 to 25° C. and then for 5 hours at 60° C. A pH of 6 is constantly maintained by dropwise addition of sodium hydroxide solution. The resulting solution is then filtered and adjusted to pH 2 with concentrated hydrochloric acid. The intermediate dyestuff of formula

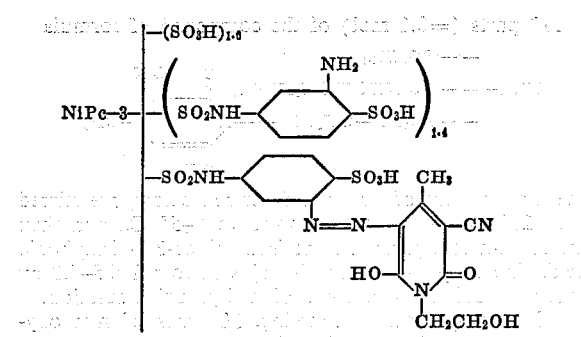

is entirely precipitated by adding sodium chlroide, filtered off and washed with a mixture of 9 parts by volume of 20% strength sodium chloride solution and 1 part by volume of concentrated hydrochloric acid until no further amino groups are detectable in the filtrate.

The resulting paste is stirred with 1200 parts of water and neutralised with sodium hydroxide solution. The whole is mixed with ice and then with a solution of 27 parts of cyanuryl chloride in acetone. The mixture is stirred at 5 to 10° C. and kept at pH 6 to 7 by dropwise addition of sodium hydroxide solution. After completion of the condensation, 45 parts by volume of 25% strength ammonia solution are added and the mixture is stirred for a further 4 hours at 40 to 45° C. The dyestuff of the formula

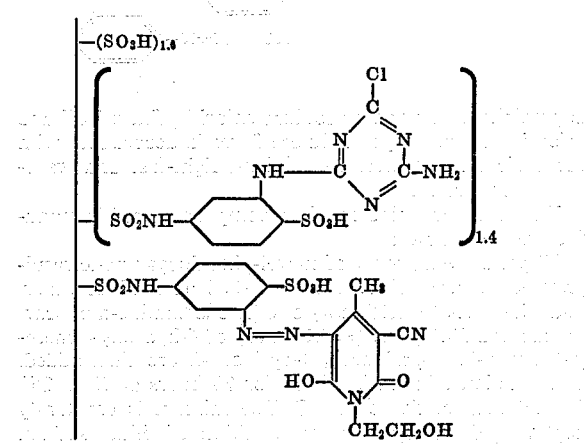

is precipitated by adding sodium chloride, filtered off and dried. It dyes cellulose fibres in pure green shades.

A green dyestuff with similar properties is obtained if instead of the 1,3-phenylenediamine-4-sulphonic acid mentioned above, an equivalent amount of 1,4-phenylenediamine-3-sulphonic acid is used.

EXAMPLE 10

96.5 parts of nickel-phthalocyanine-tetrasulpho-chloride are stirred thoroughly with 1000 parts of ice water. An aqueous suspension of 47.2 parts of the azo dyestuff of the formula

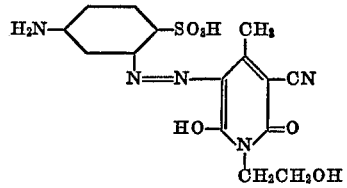

and an aqueous solution of 58.5 parts of the product of the formula

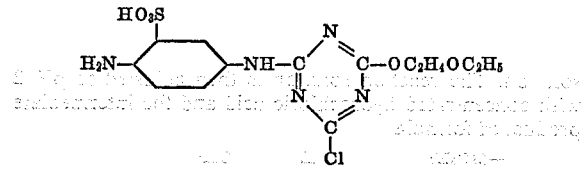

is added thereto. The mixture is stirred for 24 hours at 20 to 25° C., 100 parts by volume of dimethylformamide are then added, the temperature is raised to 40° C., and the whole is stirred for a further 15 hours. During the entire duration of the condensation a pH of 6 is maintained by dropwise addition of sodium chloride solution. Thereafter any undissolved constituents are removed by filtration and subsequently the dyestuff of the formula

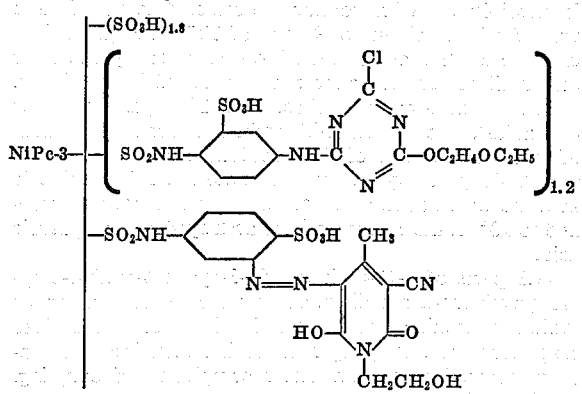

is precipitated by adding sodium chloride, filtered off and dried. It dyes cellulose fibres in pure green shades.

The same dyestuff is obtained if first only the azo dyestuff is allowed to react with the sulphochloride, the triazine compound is added after 12 hours and after a further 12 hours stirring at pH 6 and 20 to 25° C. the procedure indicated earlier is followed.

The same dyestuff is also obtained if first the triazine compound and subsequently the azo dyestuff are condensed as indicated.

EXAMPLE 11

96.5 parts of nickel-phthalocyanine-tetrasulphochloride are thoroughly stirred with 750 parts of ice water and 28.2 parts of 1,3-phenylenediamine-4-sulphonic acid and an aqueous solution of 88 parts of the compound of formula

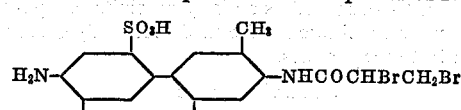

are then added. The mixture is first stirred for 2 hours at 20 to 25° C., then for 20 hours at 40° C., and then for a further 5 hours at 50° C. During the entire period the pH is kept at 6 by dropwise addition of sodium hydroxide solution. The reaction solution is then adjusted to pH 2 with concentrated hydrochloric acid and the intermediate product of formula

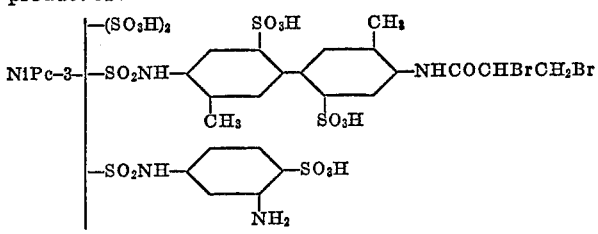

is precipitated with sodium chloride, filtered off and washed with a mixture of 9 parts of 20% strength sodium chloride solution and 1 part of concentration hydrochloric acid until no further amine can be detected in the filtrate.

The resulting paste is stirred with 2000 parts of water and adjusted to pH 7.5 with sodium hydroxide solution. 55 parts by volume of 2 N sodium nitrite and ice are added. 40 parts by volume of concentrate hydrochloric acid are then added all at once. After two hours stirring at 5 to 10° C. the excess nitrite is destroyed with sulphamic acid.

19.3 parts of 1-($\beta$-aminoethyl)-3-cyano-4-methyl-6-hydroxypyridone-2 are dissolved in water, with addition of sodium hydroxide, and the solution is added to the diazo suspension. The coupling mixture is neutralised with sodium hydroxide solution. After completion of coupling, the dyestuff of the formula

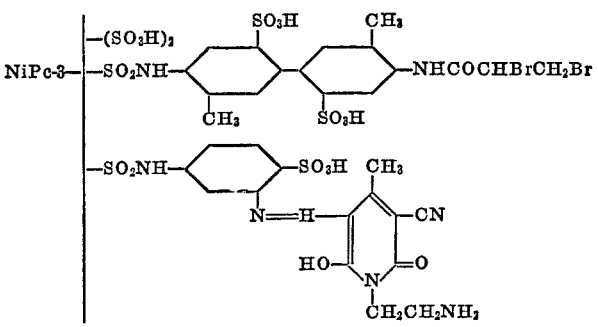

which is partly dissolved, is entirely precipitated by adding sodium chloride, filtered off and dried. It dyes cellulose fibres in fast green shades.

EXAMPLE 12

The dyestuff described in Example 11 is acylated, before isolation, with 24 parts of 2,4-dichlor-6-($\beta$-ethoxy)-ethoxy-1,3,5-triazine at 25 to 40° C. The pH is kept at between 7.5 and 8.0 by dropwise addition of dilute sodium hydroxide solution. The dyestuff of the formula

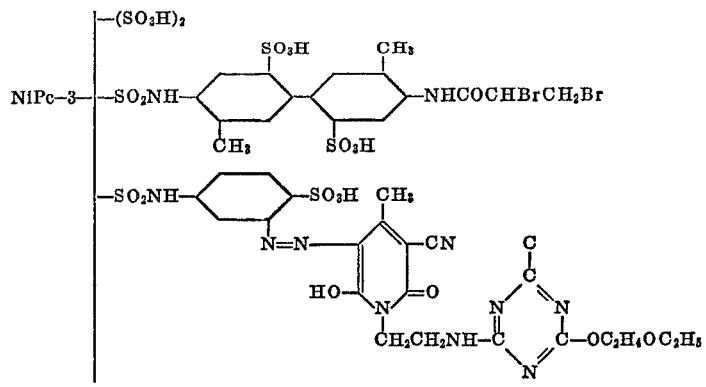

is precipitated by adding sodium chloride, filtered off and dried. It dyes cellulose fibres in fast green shades.

EXAMPLE 13

113 parts (=0.1 mol) of the compound of formula

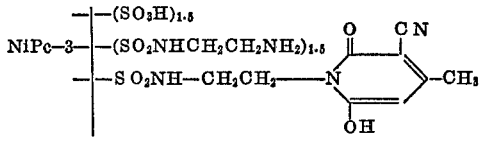

the manufacture of which is described below, are stirred with 2000 parts of water, cooled to 0–5° C., and then mixed with 25.3 parts of diazotised aniline-2,5-disulphonic acid. The coupling mixture is adjusted to pH 6.5–7.0 by cautious addition of dilute sodium hydroxide solution.

After completion of coupling, 30 parts of methoxy-4,6-dichlorotriazine, dissolved in 100 parts by volume of acetone, are added. The mixture is warmed to 40–50° C. and kept at pH 7.0 to 7.5 by dropwise addition of dilute sodium hydroxide solution. After completion of the condensation, the dyestuff of the formula

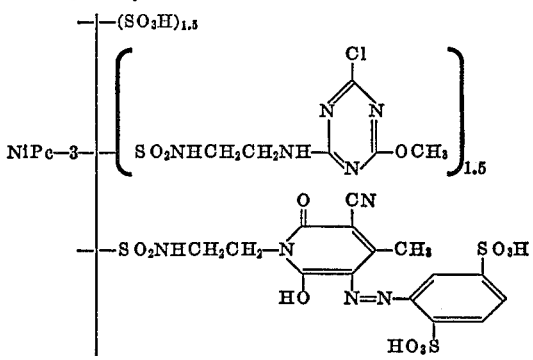

is precipitated by adding sodium chloride, filtered off and dried in vacuo. It dyes cellulose fibres in accordance with the indicated processes in brilliant, light-fast and washfast green shades.

The phthalocyanine coupling component used is manufactured as follows:

97 parts (=0.1 mol) of nickel-phthalocyanine-tetrasulphochloride are well stirred with 1000 parts of ice water, and 19.8 parts (=0.15 mol) of ethylenediamine-monocarbonate and 29.1 parts (=0.11 mol) of 6-hydroxy-4-methyl-3-cyano-N-($\beta$-aminoethyl)-pyridone-2 are then added. The reaction mixture is stirred for 20 hours at 20 to 25° C. and then at 55 to 60° C. The mixture is constantly kept at pH 9.5 by dropwise addition of dilute sodium hydroxide solution. The condensation is complete when no further alkali is consumed. In order to saponify the carbamate group, solid sodium hydroxide is added up to a concentration of 5%, and the mixture is stirred for 4 hours at 90 to 95° C. Thereafter concentrated hydrochloric acid is added at 50° C. until a strongly acid reaction to Congo Red is obtained. The product is completely precipitated with sodium chloride, filtered off at 30° C. and washed with 500 parts by volume of 5% strength hydrochloric acid.

Dyestuffs with similar properties, which also dye cotton or rayon in fast green shades, are obtained if the intermediate dyestuff is reactively acylated with the following compounds instead of with methoxy-2,4-dichloro-triazine:

2,4-dichlor-6-ethoxy-triazine,
2,4-dichloro-6-propoxy-triazine,
2,4-dichlor-6-isopropoxy-triazine,
2,4-dichlor-6-(β-ethoxy)-ethoxy-triazine,
cyanuryl chloride,
2,4-dichlor-6-amino-triazine,
2,4-dichloro-6-(β'-sulphethylamino)-1,3,5-triazine,
2,4-dichloro-6-phenylamino-3'-sulphonic acid,
2,4-dichloro-6-phenylamino-1,3,5-triazine-2',5'-disulphonic acid,
2,4-dichloro-6-phenylamino-1,3,5-triazine-2'-carboxy-5'-sulphonic acid,
2,4,5,6-tetrachloro-pyrimidine,
2,4,6-trichloropyrimidine,
2,3-dichloroquinoxaline-6-carboxylic acid chloride,
2-methylsulphonyl-4,5-dichloro-6-methylpyrimidine,
α,β-dibromopropionic acid chloride, and
tetrafluorocyclobutanecarboxylic acid chloride.

EXAMPLE 14

If the 6-hydroxy-4-methyl-3-cyano-N-(β-aminoethyl)-pyridone-2 indicated in Example 13 is replaced by an equivalent amount of 6-hydroxy-4-methyl-3-cyano-N-[β-N'-(2-hydroxyethyl)-aminoethyl]-pyridone-2 and in other respects the same procedure is followed, the dyestuff of the formula

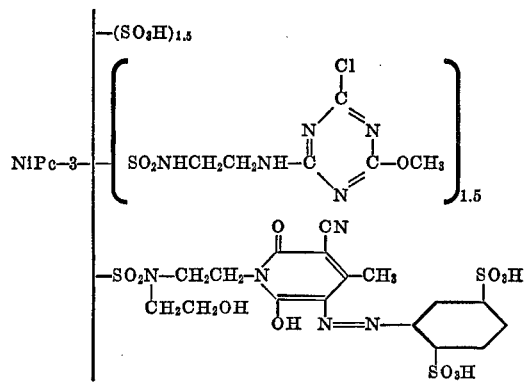

is obtained, which dyes cellulose fibres, in accordance with the indicated processes, in brilliant, light-fast and wash-fast, green shades.

EXAMPLE 15

If the 6-hydroxy-4-methyl-3-cyano-N-(β-aminoethyl)-pyridone-2 indicated in Example 13 is replaced by an equivalent amount of 6-hydroxy-4-methyl-3-aminocarbonyl-N-(β-aminoethyl)pyridone-2 and in other respects the same procedure is followed, the dyestuff of the formula which has similar good properties and dyes cellulose fibres in somewhat more bluish-tinged green shades, is obtained.

EXAMPLE 16

113 parts of the compound of the formula the manufacture of which is described in Example 13, are stirred with 2000 parts of water. 47.2 parts of the compound of the formula are diazotised in the customary manner and then added to the coupling component. The coupling mixture is adjusted to pH 6.5 to 7.0 by careful addition of dilute sodium hydroxide solution.

After completion of coupling, 49 parts of 2,4-dichloro-6-phenylamino-1,3,5-triazine-3'-sulphonic acid are added. The mixture is warmed to 40–60° C. and kept at pH 7.5 to 8 by dropwise addition of dilute sodium hydroxide solution. After completion of condensation, the dyestuff of the formula is precipitated by adding sodium chloride, filtered off and dried. It dyes cellulose fibres in brilliant, light-fast and wash-fast, green shades.

Dyestuffs with similar good properties are obtained if the diazo component indicated in the example is replaced by equivalent amounts of those listed below, and in other respects the indicated procedure is followed:

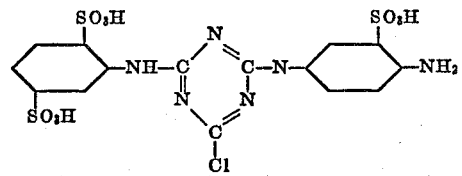

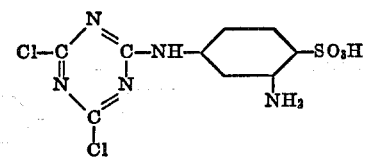

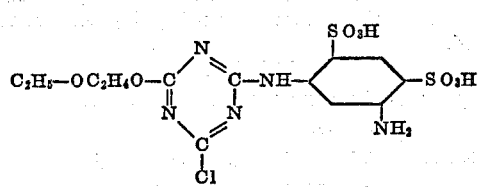

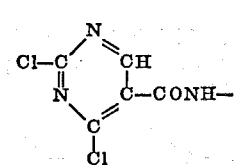

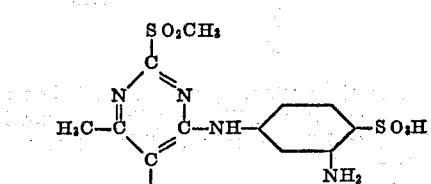

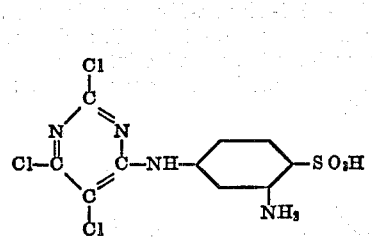

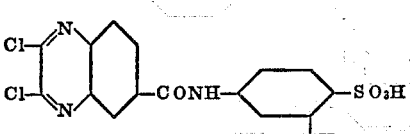

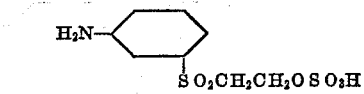

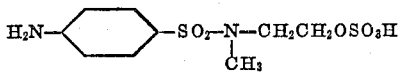

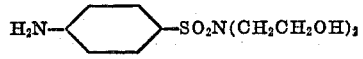

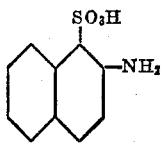

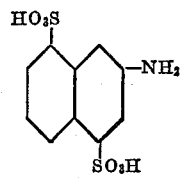

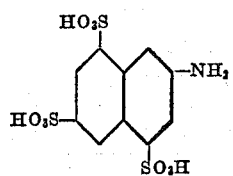

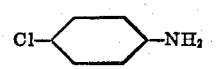

EXAMPLE 17

97 parts of nickel-phthalocyanine-tetrasulphochloride are stirred thoroughly with 1000 parts of ice water. An aqueous solution of 80 parts of the azo dyestuff of the formula

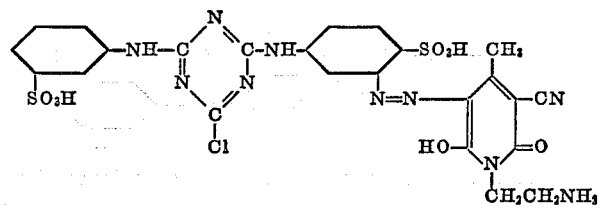

is added thereto. The mixture is stirred at 20 to 25° C. and kept at pH 8 by dropwise addition of sodium hydroxide solution. After 5 hours 15.6 parts of N-(β-hydroxyethyl)-ethylenediamine are added and the mixture is stirred for a further 20 hours at 20 to 25° C. and pH 8. The reaction mixture is then treated with 100 parts by volume of concentrated hydrochloric acid and the intermediate dyestuff is filtered off and washed with 200 parts by volume—2000 parts by volume of 5% strength hydrochloric acid.

The resulting filter residue is well stirred with 1500 parts of water and adjusted to pH 7.5 with sodium hydroxide solution. 36 parts of 2,4-dichlor-6-(β-ethoxy)-ethoxy-1,3,5-triazine are added and the acylation is carried out at 30 to 40° C., the pH being maintained at 8 by dropwise addition of dilute sodium hydroxide solution. The dyestuff of the formula

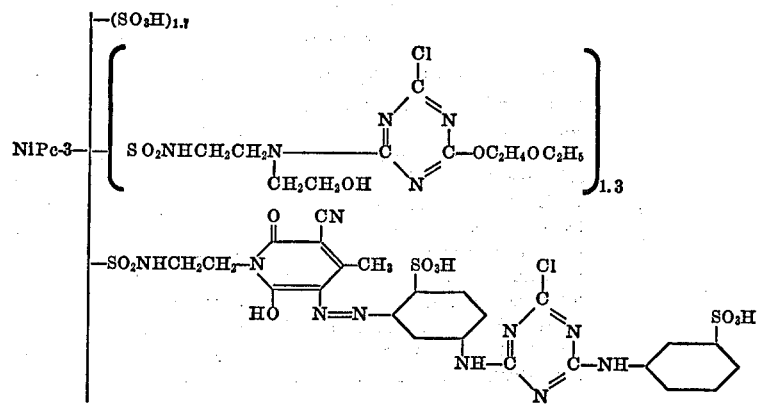

is precipitated, after completion of the reaction by the addition sodium chloride, and the precipitate is filtered off and dried. It dyes cellulose fibres in fast green shades.

EXAMPLE 18

97 parts of nickel-phthalocyanine-tetrasulphochloride are well stirred with 1000 parts of ice water. 70 parts of the compound of the formula

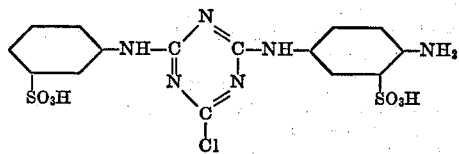

as well as 29 parts of the compound of the formula

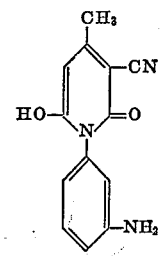

are added thereto. The reaction mixture is stirred at 20 to 30° C. and kept at pH 6.5 to 7.5 by dropwise addition of dilute sodium hydroxide solution. After completion of the condensation, the mixture is cooled to 5° C. and 30.5 parts of diazotised aniline-2,5-disulphonic acid are added. The mixture is kept at pH 6.5 to 7.5 by means of dilute sodium hydroxide solution. After completion of coupling, the dyestuff of the formula

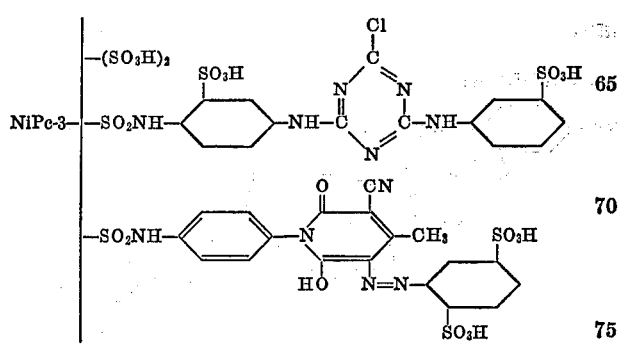

is precipitated with sodium chloride, filtered off and dried. It dyes cellulose fibres in fast green shades.

If the aminophenylpyridone employed is replaced by one of the following compounds:

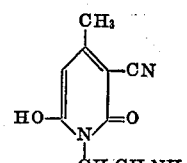

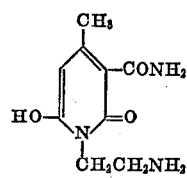

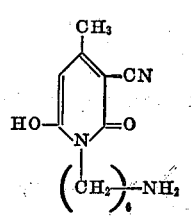

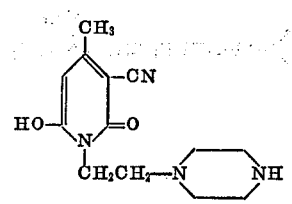

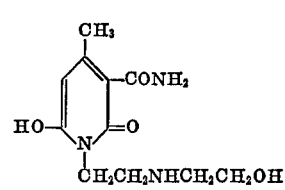

and in other respects the same procedure is followed, dyestuffs with similar good properties are obtained.

EXAMPLE 19

97 parts of nickel-phthalocyanine-tetrasulphochloride are stirred with 1000 parts of ice water. 43.6 parts of the azo dyestuff of formula

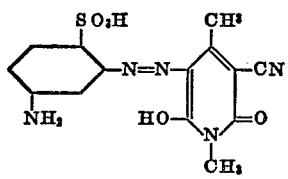

are then added in a finely powdered form. The temperature is allowed to rise to 20 to 25° C. over the course of 3 hours, with thorough stirring, and the reaction mixture is continuously kept at pH 5 to 6 by dropwise addition of dilute sodium hydroxide solution. After 20 hours, 42 parts of the compound of formula

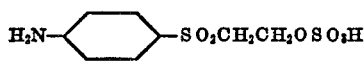

are added and the mixture is stirred for a further 24 hours under the same conditions. The resulting dyestuff of formula

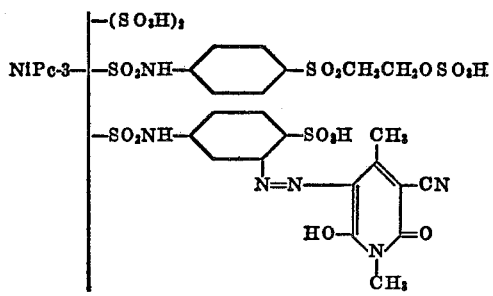

is entirely precipitated by adding sodium chloride, filtered off and dried. It dyes cellulose fibres in pure wash-fast and light-fast green shades.

If instead of the 4-aminophenyl-(β-sulphato)-ethylsulphone the corresponding β-hydroxyethylsulphone is used and its hydroxyl group is subsequently esterified in accordance with known methods, the same dyestuff is obtained.

Dyestuffs with similar good properties are obtained if instead of the 4-aminophenyl-(β-sulphato)-ethylsulphone one of the compounds listed below is employed in equivalent amount, and in other respects the same procedure is followed:

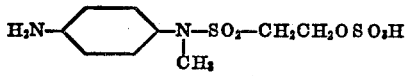

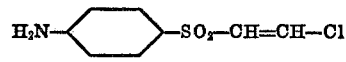

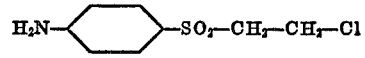

EXAMPLE 20

94.6 parts of nickel-phthalocyanine-trisulphochloride-monosulphonic acid are stirred with 1000 parts of ice water. 24.5 parts of 1,3-phenylenediamine-4-sulphonic acid as well as 17.4 parts of β-chlorethylamine hydrochloride are then added. The reaction mixture is stirred for 20 hours at 20 to 25° C. and continuously kept at pH 6 by dropwise addition of dilute sodium hydroxide solution. The temperature is then raised to 45 to 50° C. The reaction mixture is stirred for a further 10 hours at this temperature and kept at pH 7 by dropwise addition of sodium hydroxide solution. The resulting solution is adjusted to pH 2 with concentrated hydrochloric acid and the intermediate product of the formula

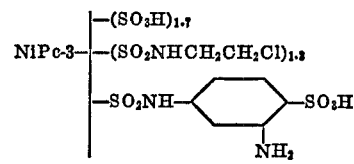

is entirely precipitated by adding sodium chloride. It is filtered off and washed with a mixture of 950 parts of 5% strength sodium chloride solution and 50 parts of concentrated hydrochloric acid until no further aromatic amine is detectable in the filtrate.

The acid paste thus obtained is dissolved in 1400 parts of water, with addition of sodium hydroxide, to give a neutral solution. 55 parts by volume of 2 N sodium nitrite solution are added, the mixture is cooled to 0 to 5° C. by adding crushed ice, and 50 parts by volume of concentrated hydrochloric acid are then added all at once. The diazotisation mixture is stirred for 3 hours at 5 to 10° C. and any excess of nitrite is then destroyed with sulphamic acid. An aqueous solution of 63 parts of the compound of formula

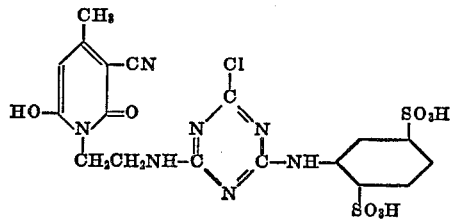

is then added to the diazo suspension and the coupling mixture is adjusted to pH 7 by adding sodium hydroxide solution. After completion of coupling at 10 to 20° C., the resulting dyestuff of the formula

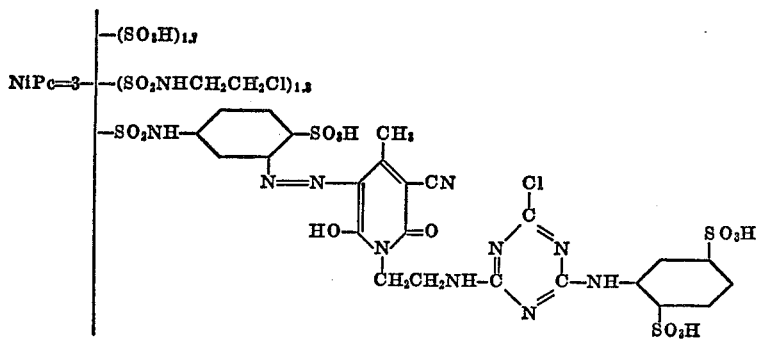

is precipitated by adding sodium chloride, filtered off and dried. It dyes cellulose fibres in pure green, light-fast and wash-fast, shades.

Dyestuffs which again have good properties are obtained if the coupling component indicated above is replaced by one of the following:

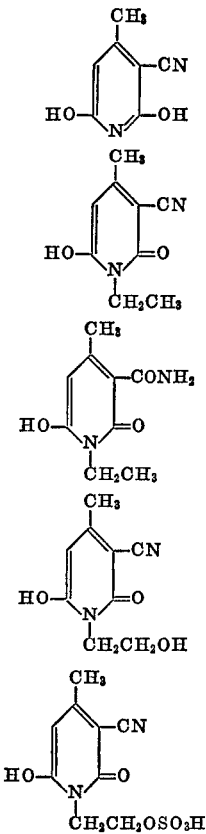

EXAMPLE 21

17.4 parts of β-chloroethylamine hydrochloride as well as an aqueous neutral solution of 57 parts of the azo dyestuff of the formula

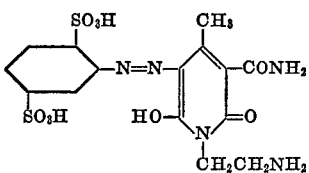

are added to a well-stirred suspension of 97 parts of nickel-phthalocyanine-tetrasulphochloride in 1000 parts of ice water. The reaction mixture is stirred for 15 hours at 20 to 25° C. and then for 10 hours at 45 to 50° C. and continuously kept at pH 7.0 to 7.5 by dropwise addition of dilute sodium hydroxide solution. The dyestuff of the formula

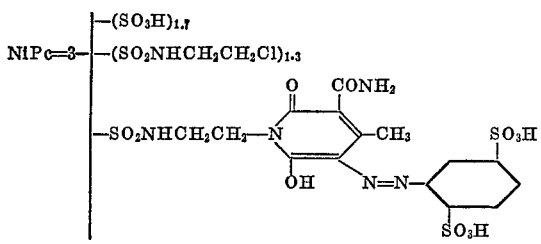

is precipitated by adding sodium chloride, filtered off and dried. It dyes cellulose fibres in pure, wash-fast and light-fast green shades.

(1) Pad dyeing instruction, with fixing by dry heat 3 parts of dyestuff, 2 parts of sodium carbonate and 25 parts of urea are dissolved in 75 parts of water. A cotton fabric is impregnated with this solution, squeezed out to 75% weight increase and dried at 80° C. The fabric is then subjected to dry heat at 140° C. for about 5 minutes, rinsed and soaped at the boil. A boil-fast dyeing results.

(2) Pad dyeing instruction with steam fixing (a) 1 part of dyestuff is dissolved in 100 parts of water. A cotton fabric is impregnated with this solution on a padder and the excess liquid is squeezed out in such a way that the fabric retains 75% of its weight of dyestuff solution. The goods impregnated in this way are dried, then impregnated at room temperature in a solution which contains 10 grams of sodium hydroxide and 300 grams of sodium chloride per litre, squeezed out to 75% liquid uptake and steamed for 60 seconds at 100 to 101° C. They are then rinsed, treated in 0.5% strength sodium bicarbonate solution, rinsed, soaped for quarter of an hour in an 0.3% strength solution of a non-ionic detergent at the boil, rinsed and dried.

(b) For rapidly reacting reactive dyestuff.—2 parts of dyestuff are dissolved in 100 parts of water with the addition of 0.5 part of sodium m-nitrobenzenesulphonate. A cotton fabric is impregnated with the resulting solution so that it increases in weight by 75%, and is then dried. Thereafter the fabric is impregnated with a solution, warmed to 20° C., which contains 5 grams of sodium hydroxide and 300 grams of sodium chloride per litre, and squeezed out to 75% weight increase, and the dyeing is steamed for 20 to 30 seconds at 100 to 101° C., rinsed, soaped for quarter of an hour in an 0.3% strength boiling solution of a non-ionic detergent, rinsed and dried.

(3) Pad dyeing instruction with cold-dwell fixing 2 parts of dyestuff are dissolved in 95 parts of water. After cooling, 5 parts of 10 N sodium hydroxide solution and 2 parts of sodium chloride are added to the dyestuff solution. A cotton fabric is impregnated with this solution, squeezed out to 60% weight increase, and kept for 12 to 14 hours at room temperature in the moist state. Thereafter it is washed with cold water and boiling water, and dried.

Satisfactory fixing is also already achieved after 6 hours storage instead of 12 to 14 hours.

(4) Direct dyeing instruction 2 parts of dyestuff together with 80 parts of tri-sodium phosphate are dissolved in 400 parts of water and diluted to 4000 parts. After adding 80 parts of sodium chloride, 100 parts of a cotton fabric are intoduced into this dyebath, the temperature is raised to 60° C. over the course of half an hour, a further 80 parts of sodium chloride are added, and the temperature is raised to 80° C. over the course of quarter of an hour and kept for half an hour at this temperature. The resulting dyeing is then rinsed and soaped for 15 minutes in a boiling 0.3% strength solution of a non-ionic detergent. It displays excellent fastness properties.

(5) Direct dyeing instruction for wool 100 parts of wool knitting yarn are introduced at 50 to 80° C. into a dyebath which contains 10 parts of crystalline sodium sulphate, 6 parts of 40% strength acetic acid, 0.5 part of an addition product of oleylamine and ethylene oxide and 2 parts of dyestuff in 3000 parts of water. The bath is heated to the boil over the course of half an hour and dyeing is then carried out for one hour at the boil. Thereafter the wool is rinsed and dried.

(6) Printing instruction (a) 2 parts of dyestuff are mixed with 20 parts of urea, dissolved in 28 parts of water and stirred into 40 parts of a 5% strength sodium alginate thickener. 10 parts of a 10% strength sodium carbonate solution are then added.

A cotton fabric is printed with the printing paste thus obtained on a roller printing machine and dried, and the resulting printed fabric is steamed for 8 minutes at 100° C. in saturated steam. The printed fabric is then thoroughly rinsed in cold and hot water, in the course of which the parts which have not been chemically fixed can be very easily removed from the fibre, and is subsequently dried.

(b) (For rapidly reacting reactive dyestuffs).—2 parts of dyestuff are sprinkled, with rapid stirring, into 100 parts of a stock thickener, containing 45 parts of 5% strength sodium alginate thickener, 32 parts of water, 20 parts of urea, 1 part of sodium m-nitrobenzenesulphonate and 2 parts of sodium bicarbonate.

A cotton fabric is printed on a roller printing machine with the printing paste thus obtained and the resulting printed fabric is steamed for 1 to 2 minutes at 100° C. in saturated steam. The printed fabric is then thoroughly rinsed in cold and hot water, in the course of which the constituents which have not been chemically fixed can be very easily removed from the fibre, and is subsequently dried.

What is claimed is:

1. A phthalocyanine dyestuff of the formula

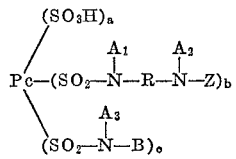

in which
Pc is nickel or copper phthalocyanine
$A_1$, $A_2$ and $A_3$ each independently is hydrogen, lower alkyl or hydroxyethyl
R is phenylene, methylenephenylene, ethylenephenylene or diphenylene, each of which is unsubstituted or substituted in the phenylene moiety by one or more of chloro, $C_1$–$C_2$ alkoxy, $C_1$–$C_2$ alkyl or sulfonic acid, or alkylene of 2 to 6 carbon atoms, or cycloalkylene having up to 6 carbon atoms each of which is unsubstituted or substituted by β-hydroxyethyl, acetyl or carbamyl, ethylenepiperazinylene or R together with $A_1$ and $A_2$ forms piperazinylene or piperidinylene,
Z is a cellulose fibre-reactive group capable of reacting with the hydroxyl groups of cellulose to form a covalent bond
B is a group of the formula

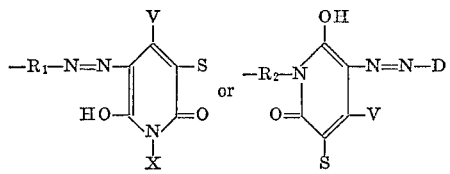

in which
$R_1$ is phenylene, methylenephenylene or ethylenephenylene where the phenylene moiety is substituted by at least one of chloro, $C_1$–$C_2$ alkoxy, $C_1$–$C_2$ alkyl or sulfonic acid and wherein the phenyl moiety is bound to the azo group
V is lower alkyl, phenyl, tolyl, carboxylic acid ethyl ester, carboxylic acid benzyl ester, methylene carboxylic acid ethyl ester, carbamyl, N-ethyl carbamyl, or β-cyanoethylene
S is nitrile, carboxylic acid ethyl ester, carbamyl, N,N-dimethylsulfamyl, methylsulfonyl or phenylsulfonyl
X is hydrogen, lower alkyl which is unsubstituted or substituted by amino, hydroxyl, sulfonic acid or β-hydroxyethyleneamine, phenyl, benzyl, cyclohexyl, each of which can be substituted by amino, or X is a group of the formula

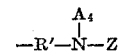

where
R' is alkylene of 1 to 6 carbon atoms, cyclohexylene, phenylene or methylenephenylene
$A_4$ is hydrogen or lower alkyl and
Z is a fiber-reactive group as defined above
$R_2$ is $C_1$–$C_6$ alkylene
D is benzenesulfonate containing one or more sulfonic acid groups and substituted by one or more of chloro, hydroxy, methoxy, methyl, carboxy, acetamido, benzamido, nitro, sulphoacetylamino, trifluoromethyl or aminobenzoyl, or naphthalenesulfonate containing at least one sulfonic acid group and D can additionally be substituted by a member of group Z as defined above and
a, b and c each, independently is an integer of fractional number provided that b and c is each at least 1.0 and the sum of $a+b+c$ is an integer or fractional number between 3.0 and 4.0.

2. A dyestuff as claimed in claim 1, wherein the radical represented by D contains a radical of the formula

as substituent, wherein Z' and $A_4$ have the meanings given in claim 1.

3. A dyestuff as claimed in claim 1, wherein low molecular weight alkyl represented by $A_1$, $R_2$, $A_3$ or $A_4$ contains at most 4 carbon atoms.

4. A dyestuff as claimed in claim 1, wherein Pc represents the radical of copper- or nickel-phthalocyanine, D represents sulphobenzene or sulphonaphthalene, each of $A_1$, $A_2$, $A_3$ and $A_4$, which may be the same or different, represents methyl, ethyl, hydroxyethyl or hydrogen, R, $R_2$ and R', which may be the same or different represent alkylene with 1 to 6 carbon atoms, $R_1$ represents sulphophenylene, a represents at least 1.0 and $a+b+c=4.0$.

5. A dyestuff as claimed in claim 1, wherein Z or Z' represents α-chloracetyl, acryl, α-chloracryl or bromacryl, α,β-dichloropropionyl or dibromopropionyl or β-chloro-, bromo-, sulphato-, phenylsulphnyl-, β-sulphatoethylsulphonyl or 4,5-dichloropyrazinon-6-yl-1-propionyl.

6. A dyestuff as claimed in claim 1, wherein Z or Z' represents 2,6-dichloropyrimidine-5-carbonyl, 2,3-dichloroquinoxaline-7-carbonyl, 1,4 - dichlorophthalazine-7-carbonyl or 2 - vinylsulphonyl-(2,1,2)-bicycloheptane-5-carbonyl.

7. A dyestuff as claimed in claim 1, wherein Z or Z' represents vinylsulphonyl, β-sulphato- or -diethylaminoethylsulphonyl or 2-chlorobenzthiazole-5- or -6-sulphonyl.

8. A dyestuff as claimed in claim 1, wherein Z or Z' represents 2,4,5-trichloropyrimidyl-6 or 2-methylsulphonyl-4-methyl-5-chloropyridyl-6.

9. A dyestuff as claimed in claim 1, wherein Z represents 1,3,5-triazinyl-6 which contains in the 2-position chlorine or bromine, quaternary pyridinum trimethylammonium or sulpho and contains in the 4-position chlorine, bromine amino which is unsubstituted or substituted by lower alkyl, methoxy or ethoxyethoxy.

10. A dyestuff as claimed in claim 1, wherein Z represents 2-chloro-1,3,5-triazinyl-6 radical which contains in the 4-position chlorine amino which is unsubstituted or substituted by lower alkyl sulphomethyl, hydroxyalkyl, sulphatoethyl phenyl, sulphophenyl or carboxyphenyl N-piperidyl or morpholinyl, methoxy or ethoxyethoxy.

11. A phthalocyanine dyestuff according to claim 1 of the formula

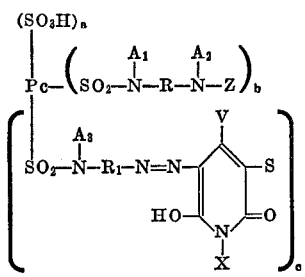

12. A phthalocyanine dyestuff according to claim 11 in which
$A_1$, $A_2$ and $A_3$ each independently is hydrogen or lower alkyl
R is alkylene of 2 to 6 carbon atoms or, with $A_1$ and $A_2$ forms piperazinylene
$R_1$ is phenylene or sulfophenylene
V is lower alkyl
S is hydrogen, nitrile or carbonamide
X is hydrogen or lower alkyl which is unsubstituted or substituted by OH or $OSO_3H$
$a$ is at least 1.0
$a+b+c=4.0$.

13. A dyestuff according to claim 7 in which
Pc is nickel phthalocyanine
$a$ is 1.2
$b$ is 1.5
$c$ is 1.2
$A_1$, $A_2$ and $A_3$ are each hydrogen
R is ethylene
Z is

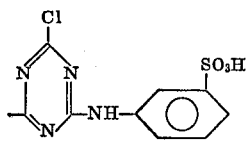

$R_1$ is sulphophenylene
V is methyl
S is nitrile
X is hydrogen.

14. A dyestuff according to claim 7 in which
Pc is nickel phthalocyanine
$a$ is 1.3
$b$ is 1.5
$c$ is 1.2
$A_1$, $A_2$ and $A_3$ are each hydrogen
R is ethylene
Z is

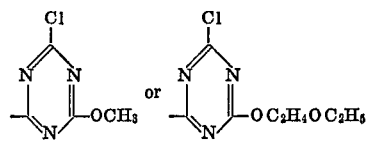

$R_1$ is sulphophenylene
V is methyl
S is nitrile
X is methyl or β-hydroxyethylene.

15. A dyestuff according to claim 7 in which
$a$ is 1.5
$b$ is 1.3
$c$ is 1.2
$A_1$, $A_2$ and $A_3$ are each hydrogen
R is ethylene
Z is

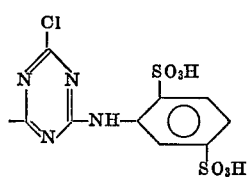

$R_1$ is sulphophenylene
V is methyl
S is —$CONH_2$
X is ethyl.

References Cited
UNITED STATES PATENTS

| | | | |
|---|---|---|---|
| 3,133,050 | 5/1964 | Von Tobel | 260—146 |
| 3,009,920 | 11/1961 | Jaeger et al. | 260—146 X |
| 3,082,201 | 3/1963 | Koller | 260—146 |
| 3,082,207 | 3/1963 | Koller | 260—146 X |
| 3,132,129 | 5/1964 | Dortmann et al. | 260—146 X |
| 3,278,548 | 10/1966 | Kühne et al. | 260—146 X |
| 3,384,644 | 5/1968 | Freyermuth et al. | 260—146 X |
| 3,426,016 | 2/1969 | Springer et al. | 260—146 X |
| 3,487,066 | 12/1969 | Ritter et al. | 260—156 |
| 3,489,741 | 1/1970 | Grimmel | 260—146 |
| 3,565,883 | 2/1971 | Dimroth | 260—156 |

FLOYD D. HIGEL, Primary Examiner

U.S. Cl. X.R.

8—42 R, 62, 63; 260—146 R, 146 D, 153, 154, 156, 242, 249.5, 249.8, 250 R, 270 P, 293.87, 296 R, 314.5, 458

UNITED STATES PATENT OFFICE
CERTIFICATE OF CORRECTION

Patent No. 3,752,801  Dated August 14, 1973

Inventor(s) GERD HOELZLE AND ALFRED FASCIATI

It is certified that error appears in the above-identified patent and that said Letters Patent are hereby corrected as shown below:

Column 40, Claim 3, line 38, delete "$R_2$" and substitute --- $A_2$ ---.

Column 40, Claim 5, line 51, delete "phenylsulphnyl-" and substitute --- phenylsulphonyl- ---.

Column 41, Claim 13, line 27, delete "claim 7" and substitute --- claim 12 ---.

Column 41, Claim 14, line 46, delete "claim 7" and substitute --- claim 12 ---.

Column 42, Claim 15, line 13, delete "claim 7" and substitute --- claim 12 ---.

Signed and sealed this 27th day of November 1973.

(SEAL)
Attest:

EDWARD M. FLETCHER, JR.
Attesting Officer

RENE D. TEGTMEYER
Acting Commissioner of Patents